United States Patent
Kutz et al.

(10) Patent No.: US 12,308,872 B2
(45) Date of Patent: May 20, 2025

(54) CALCULATING COEFFICIENTS IN LOW-COMPLEXITY DIGITAL POST-DISTORTION PROCEDURES

(71) Applicant: QUALCOMM Incorporated, San Diego, CA (US)

(72) Inventors: Gideon Shlomo Kutz, Ramat Hasharon (IL); Amit Moses, Tel Aviv (IL); Yaniv Eistein, Tel Aviv (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 18/361,521

(22) Filed: Jul. 28, 2023

(65) Prior Publication Data

US 2025/0038780 A1    Jan. 30, 2025

(51) Int. Cl.
*H04B 1/12* (2006.01)
(52) U.S. Cl.
CPC ...................................... *H04B 1/12* (2013.01)
(58) Field of Classification Search
CPC ........................................................ H04B 1/12
See application file for complete search history.

(56) References Cited

U.S. PATENT DOCUMENTS

| | | | | |
|---|---|---|---|---|
| 10,382,132 B2* | 8/2019 | Gupta | .................... | H04B 10/40 |
| 11,595,066 B2* | 2/2023 | Kularatna | ............... | H03F 3/189 |
| 2023/0308338 A1* | 9/2023 | McCormick | ............. | H03F 3/68 |

* cited by examiner

*Primary Examiner* — Dac V Ha
(74) *Attorney, Agent, or Firm* — Holland & Hart LLP

(57) ABSTRACT

Methods, systems, and devices for wireless communication are described. A user equipment (UE) may receive an indication that the UE is to apply a digital-post distortion (DPoD) procedure to a received signal to reduce non-linearities of the received signal. In some examples, the UE may determine one or more autocorrelation values for a power delay profile (PDP) of a channel, receive an indication of a matrix, and identify coefficients (e.g., b-coefficients) for use in the DPoD procedure based on multiplying the autocorrelation values and the matrix. Alternatively, a network entity may determine the autocorrelation values indicate them to the UE for use in identifying the coefficients. In some other cases, the network entity may use the autocorrelation values and the matrix to determine the coefficients and then may indicate the coefficients to the UE. The UE may apply the DPoD procedure to the received signal using the coefficients.

30 Claims, 20 Drawing Sheets

CALCULATING COEFFICIENTS IN LOW-COMPLEXITY DIGITAL POST-DISTORTION PROCEDURES

FIELD OF TECHNOLOGY

The following relates to wireless communication, including calculating coefficients in low-complexity digital post-distortion (DPoD) procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support calculating coefficients in low-complexity digital post-distortion (DPoD) procedures. For example, the described techniques provide for reducing non-linearities in signals transmitted through a power amplifier (PA). Specifically, the techniques described herein may support generating the b-coefficients that may be applied to identify and remove the non-linearities at the receiver without requiring the receiver to have knowledge of precoding used by the transmitter. In some examples, a receiver or a transmitter may determine the b-coefficients based on multiplying a fixed matrix with a vector representative of one or more autocorrelation values of a power delay profile (PDP) for a transmitted signal. The receiver or the transmitter may determine the autocorrelation values, and the transmitter may determine the matrix based on a precoding rule used by the transmitter and in some cases, indicate the matrix to the receiver. Because the matrix may be associated with the precoder rule but is not explicitly the precoder rule itself, the transmitter may refrain from indicating the precoder rule.

The receiver and the transmitter may support two alternatives for determine the b-coefficients. For example, in some cases, the receiver may determine (e.g., measure) an autocorrelation value for a PDP associated with a received signal. The receiver may forward the autocorrelation value to the transmitter, and the transmitter may then select an appropriate matrix based on a precoding rule and multiply the matrix with the autocorrelation value to determine the b-coefficients. The transmitter may return the resulting b-coefficients to the receiver for use in a DPoD procedure. Alternatively, the transmitter may estimate an autocorrelation value and forward the autocorrelation value and the matrix to the receiver such that the receiver may multiply the autocorrelation value and the matrix to determine the b-coefficients for use in a DPoD procedure.

A method for wireless communications by a user equipment (UE) is described. The method may include receiving, from a network entity, an indication that the UE is to apply a DPoD procedure to a received signal for reducing a transmitter-introduced non-linearity component of the received signal, determining one or more autocorrelation values for a PDP of a communication channel associated with the received signal, identifying a set of multiple coefficients for use in the DPoD procedure, where the set of multiple coefficients are based on the one or more autocorrelation values, and applying the DPoD procedure to the received signal by using the set of multiple coefficients.

A UE for wireless communications is described. The UE may include one or more memories storing processor executable code, and one or more processors coupled with the one or more memories. The one or more processors may individually or collectively operable to execute the code to cause the UE to receive, from a network entity, an indication that the UE is to apply a DPoD procedure to a received signal for reducing a transmitter-introduced non-linearity component of the received signal, determine one or more autocorrelation values for a PDP of a communication channel associated with the received signal, identify a set of multiple coefficients for use in the DPoD procedure, where the set of multiple coefficients are based on the one or more autocorrelation values, and apply the DPoD procedure to the received signal by using the set of multiple coefficients.

Another UE for wireless communications is described. The UE may include means for receiving, from a network entity, an indication that the UE is to apply a DPoD procedure to a received signal for reducing a transmitter-introduced non-linearity component of the received signal, means for determining one or more autocorrelation values for a PDP of a communication channel associated with the received signal, means for identifying a set of multiple coefficients for use in the DPoD procedure, where the set of multiple coefficients are based on the one or more autocorrelation values, and means for applying the DPoD procedure to the received signal by using the set of multiple coefficients.

A non-transitory computer-readable medium storing code for wireless communications is described. The code may include instructions executable by a processor to receive, from a network entity, an indication that the UE is to apply a DPoD procedure to a received signal for reducing a transmitter-introduced non-linearity component of the received signal, determine one or more autocorrelation values for a PDP of a communication channel associated with the received signal, identify a set of multiple coefficients for use in the DPoD procedure, where the set of multiple coefficients are based on the one or more autocorrelation values, and apply the DPoD procedure to the received signal by using the set of multiple coefficients.

In some examples of the method, UE, and non-transitory computer-readable medium described herein, determining the one or more autocorrelation values for the PDP may include operations, features, means, or instructions for determining the one or more autocorrelation values for the PDP based on measurements of one or more reference signals transmitted by the network entity.

Some examples of the method, UE, and non-transitory computer-readable medium described herein may further include operations, features, means, or instructions for receiving, from the network entity, information indicative of one or more transmit antennas associated with the one or more reference signals, where the UE determines the one or more autocorrelation values for the PDP based on the information.

In some examples of the method, UE, and non-transitory computer-readable medium described herein, determining the one or more autocorrelation values may include operations, features, means, or instructions for determining an average autocorrelation value associated with the one or more transmit antennas indicated by the information.

In some examples of the method, UE, and non-transitory computer-readable medium described herein, the information indicates organization of the one or more transmit antennas into one or more transmit antenna groups, where the UE determines an autocorrelation value for each of the one or more transmit antenna groups.

Some examples of the method, UE, and non-transitory computer-readable medium described herein may further include operations, features, means, or instructions for transmitting a report indicative of the one or more autocorrelation values to the network entity.

In some examples of the method, UE, and non-transitory computer-readable medium described herein, the report may be transmitted in accordance with a periodic, semi-persistent, or aperiodic schedule.

In some examples of the method, UE, and non-transitory computer-readable medium described herein, identifying the set of multiple coefficients may include operations, features, means, or instructions for receiving, from the network entity and in response to transmission of the report, information indicative of the set of multiple coefficients for use in the DPoD procedure, where the set of multiple coefficients may be based on the one or more autocorrelation values and a matrix that may be based on a precoding rule used by a network entity.

In some examples of the method, UE, and non-transitory computer-readable medium described herein, determining the one or more autocorrelation values for the PDP may include operations, features, means, or instructions for receiving, from the network entity, first information indicative of the one or more autocorrelation values.

In some examples of the method, UE, and non-transitory computer-readable medium described herein, receiving the first information indicative of the one or more autocorrelation values may include operations, features, means, or instructions for receiving a weight associated with each of the set of multiple autocorrelation values for the PDP, where the weight corresponds to a percentage of transmit antennas of the network entity for which each of the set of multiple autocorrelation values may be applicable.

Some examples of the method, UE, and non-transitory computer-readable medium described herein may further include operations, features, means, or instructions for receiving a first control message that indicates a matrix, wherein the matrix is based at least in part on a precoding rule used by the network entity, and wherein identification of the plurality of coefficients is based at least in part on the matrix and the one or more autocorrelation values.

In some examples of the method, UE, and non-transitory computer-readable medium described herein, the first control message may be received periodically or aperiodically.

Some examples of the method, UE, and non-transitory computer-readable medium described herein may further include operations, features, means, or instructions for receiving a second control message that indicates a set of multiple matrices, where the first control message indicates the matrix from the set of multiple matrices.

Some examples of the method, UE, and non-transitory computer-readable medium described herein may further include operations, features, means, or instructions for transmitting an uplink message that indicates a quantity of antennas used by the UE to receive the received signal, where the matrix indicated by the first control message may be based on the quantity of antennas indicated by the UE.

Some examples of the method, UE, and non-transitory computer-readable medium described herein may further include operations, features, means, or instructions for transmitting an uplink message that indicates a set of multiple quantities of antennas available to be used by the UE to receive the received signal, receiving a control message that indicates a set of multiple matrices, each of the set of multiple matrices usable with the one or more autocorrelation values for identifying the set of multiple coefficients, each of the set of multiple matrices based on a corresponding precoding rule used by the network entity and on a respective one of the set of multiple quantities of antennas, and selecting a matrix from the set of multiple matrices based on a quantity of antennas used by the UE to receive the received signal.

Some examples of the method, UE, and non-transitory computer-readable medium described herein may further include operations, features, means, or instructions for determining the set of multiple coefficients for use in the DPoD procedure based on the one or more autocorrelation values and a matrix that may be based on a precoding rule used by the network entity.

In some examples of the method, UE, and non-transitory computer-readable medium described herein, the matrix may be further based on one or more of a first quantity of UE antennas for receipt of the received signal, a second quantity of transmit antennas for transmission of the received signal, or network entity antenna correlation and topology, and where the matrix may be independent of the PDP.

A method for wireless communications by a network entity is described. The method may include transmitting an indication that a UE is to apply a DPoD procedure to a received signal in order to reduce a transmitter-introduced non-linearity component of the received signal, determining one or more autocorrelation values for a PDP of a communication channel associated with the received signal, and determining a matrix for use with the one or more autocorrelation values to identify a set of multiple coefficients for use in the DPoD procedure, where the matrix is based on a precoding rule used by the network entity.

A network entity for wireless communications is described. The network entity may include one or more memories storing processor executable code, and one or more processors coupled with the one or more memories. The one or more processors may individually or collectively operable to execute the code to cause the network entity to transmit an indication that a UE is to apply a DPoD procedure to a received signal in order to reduce a transmitter-introduced non-linearity component of the received signal, determine one or more autocorrelation values for a PDP of a communication channel associated with the received signal, and determine a matrix for use with the one or more autocorrelation values to identify a set of multiple coefficients for use in the DPoD procedure, where the matrix is based on a precoding rule used by the network entity.

Another network entity for wireless communications is described. The network entity may include means for transmitting an indication that a UE is to apply a DPoD procedure to a received signal in order to reduce a transmitter-introduced non-linearity component of the received signal, means for determining one or more autocorrelation values for a PDP of a communication channel associated with the received signal, and means for determining a matrix for use with the one or more autocorrelation values to identify a set of multiple coefficients for use in the DPoD procedure, where the matrix is based on a precoding rule used by the network entity.

A non-transitory computer-readable medium storing code for wireless communications is described. The code may include instructions executable by a processor to transmit an indication that a UE is to apply a DPoD procedure to a received signal in order to reduce a transmitter-introduced non-linearity component of the received signal, determine one or more autocorrelation values for a PDP of a communication channel associated with the received signal, and determine a matrix for use with the one or more autocorrelation values to identify a set of multiple coefficients for use in the DPoD procedure, where the matrix is based on a precoding rule used by the network entity.

In some examples of the method, network entities, and non-transitory computer-readable medium described herein, determining the one or more autocorrelation values for the PDP may include operations, features, means, or instructions for receiving, from the UE, a report indicative of the one or more autocorrelation values, where the one or more autocorrelation values may be based on measurements of one or more reference signals transmitted by the network entity.

Some examples of the method, network entities, and non-transitory computer-readable medium described herein may further include operations, features, means, or instructions for transmitting, to the UE, information indicative of one or more transmit antennas associated with the one or more reference signals, where the one or more autocorrelation values for the PDP may be based on the information.

In some examples of the method, network entities, and non-transitory computer-readable medium described herein, the one or more autocorrelation values include an average autocorrelation value associated with the one or more transmit antennas indicated by the information.

In some examples of the method, network entities, and non-transitory computer-readable medium described herein, the information indicates organization of the one or more transmit antennas into one or more transmit antenna groups, where the one or more autocorrelation values may be included in the report on a per transmit antenna group basis.

In some examples of the method, network entities, and non-transitory computer-readable medium described herein, the report may be received in accordance with a periodic, semi-persistent, or aperiodic schedule.

Some examples of the method, network entities, and non-transitory computer-readable medium described herein may further include operations, features, means, or instructions for identifying the set of multiple coefficients for use in the DPoD procedure based on the one or more autocorrelation values and on the matrix and transmitting, to the UE and in response to the report, information indicative of the set of multiple coefficients for use in the DPoD procedure.

Some examples of the method, network entities, and non-transitory computer-readable medium described herein may further include operations, features, means, or instructions for transmitting, to the UE, first information indicative of the one or more autocorrelation values, where the one or more autocorrelation values may be estimated with respect to one or more reference signals.

In some examples of the method, network entities, and non-transitory computer-readable medium described herein, transmitting the first information indicative of the one or more autocorrelation values may include operations, features, means, or instructions for transmitting a weight associated with each of the set of multiple autocorrelation values for the PDP, where the weight corresponds to a percentage of transmit antennas of the network entity for which each of the set of multiple autocorrelation values may be applicable.

Some examples of the method, network entities, and non-transitory computer-readable medium described herein may further include operations, features, means, or instructions for transmitting a first control message that indicates the matrix, wherein identification of the set of multiple coefficients is based on the matrix and the one or more autocorrelation values.

In some examples of the method, network entities, and non-transitory computer-readable medium described herein, the first control message may be transmitted periodically or aperiodically.

Some examples of the method, network entities, and non-transitory computer-readable medium described herein may further include operations, features, means, or instructions for transmitting a second control message that indicates a set of multiple matrices, where the first control message indicates the matrix from the set of multiple matrices.

Some examples of the method, network entities, and non-transitory computer-readable medium described herein may further include operations, features, means, or instructions for receiving an uplink message that indicates a quantity of antennas used by the UE to receive the received signal, where the matrix indicated by the first control message may be based on the quantity of antennas indicated by the UE.

Some examples of the method, network entities, and non-transitory computer-readable medium described herein may further include operations, features, means, or instructions for receiving an uplink message that indicates a set of multiple quantities of antennas available to be used by the UE to receive the received signal and transmitting a control message that indicates a set of multiple matrices, each of the set of multiple matrices usable with the one or more autocorrelation values for identifying the set of multiple coefficients, each of the set of multiple matrices based on a corresponding precoding rule used by the network entity and on a respective one of the set of multiple quantities of antennas, where the matrix may be one of the set of multiple matrices.

In some examples of the method, network entities, and non-transitory computer-readable medium described herein, the matrix may be further based on one or more of a first quantity of UE antennas for receipt of the received signal, a second quantity of transmit antennas for transmission of the received signal, or network entity antenna correlation and topology, and where the matrix may be independent of the PDP.

DETAILED DESCRIPTION

Figure 1:
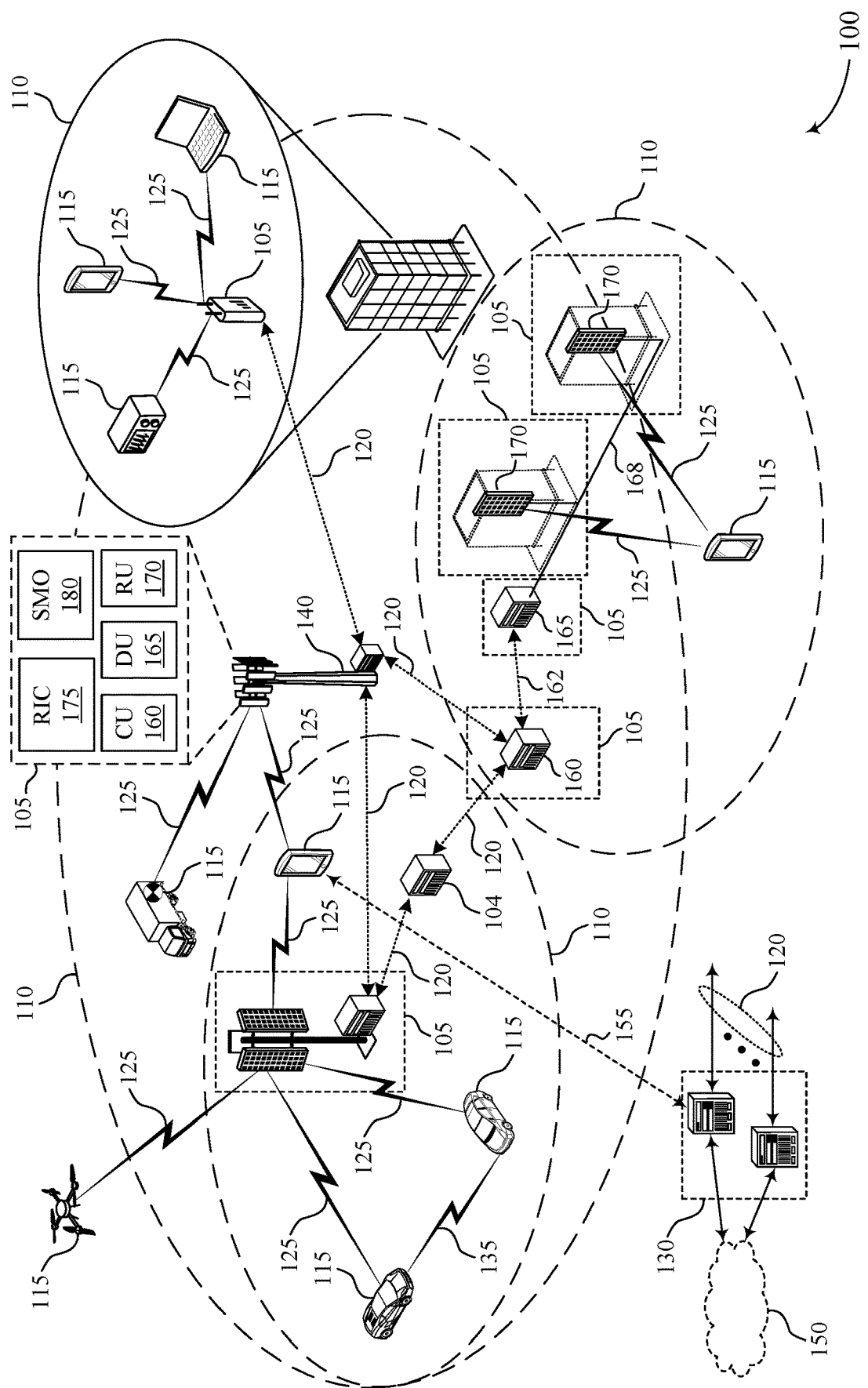
FIG. 1 shows an example of a wireless communications system that supports calculating coefficients in low-complexity digital post-distortion (DPoD) procedures in accordance with one or more aspects of the present disclosure.

A transmitter (e.g., a network entity or other wireless device) may apply a power amplifier (PA) to transmitted signals to increase transmit power. The transmitter may operate the PA such that any non-linearities the PA may introduce into a transmitted signal are minimized. However, such operation may reduce the efficiency of the PA. Alternatively, if the transmitter operates the PA to provide greater amplification, non-linearities may be introduced into the transmitted signal (e.g., because of non-linearities in the PA). In such cases, a receiver (e.g., a user equipment (UE) may use digital post-distortion (DPoD) techniques to reconstruct the non-linearities and subtract them from the received signal in an iterative manner to improve the linearity of the received signal. However, current DPoD techniques may be highly complex (e.g., if they depend on a quantity of transmit antennas used to transmit the signal) and may require the receiver to have knowledge of precoders used by the transmitter. The result of current DPoD techniques is the generation of a set of coefficients (also referred to herein as b-coefficients) that may be applied to identify and remove the non-linearities at the receiver.

The techniques described herein may support the calculation of coefficients in low-complexity, DPoD models to reduce non-linearities in signals transmitted through a PA. Specifically, the techniques described herein may support generating the b-coefficients that may be applied to identify and remove the non-linearities at the receiver without requiring the receiver to have knowledge of precoding used by the transmitter. In some examples, a receiver or a transmitter may determine the b-coefficients based on multiplying a fixed matrix with a vector representative of one or more autocorrelation values of a power delay profile (PDP) for a transmitted signal. The receiver or the transmitter may determine the autocorrelation values, and the transmitter may determine the matrix based on a precoding rule used by the transmitter and in some cases, indicate the matrix to the receiver. Because the matrix may be associated with the precoder rule but is not explicitly the precoder rule itself, the transmitter may refrain from indicating the precoder rule.

The receiver and the transmitter may support two alternatives for determine the b-coefficients. For example, in some cases, the receiver may receive an indication to apply a DPoD procedure to a received signal to reduce transmitter-induced non-linear components of a received signal. The receiver may determine one or more autocorrelation values for a PDP of a communication channel associated with the received signal, and in some cases, the receiver may transmit a report to the transmitter indicating the one or more PDP autocorrelation values. The transmitter may determine a matrix for use with the one or more PDP autocorrelation values to identify a set of b-coefficients for use by the receiver in the DPoD procedure. The matrix may be based on a precoding rule used by the transmitter, among other factors. The transmitter may use the one or more PDP autocorrelation values and the matrix to determine the set of multiple b-coefficients, and the transmitter may transmit information indicative of the b-coefficients to the receiver such that the receiver may use the b-coefficients in the DPoD procedure.

Alternatively, after transmitting the indication to apply the DPoD procedure, the transmitter may determine one or more autocorrelation values for a PDP of a communication channel associated with the received signal, and in some cases, the transmitter may transmit a report to the receiver indicating the one or more PDP autocorrelation values. The transmitter may determine a matrix for use with the one or more PDP autocorrelation values to identify a set of b-coefficients for use by the receiver in the DPoD procedure. The matrix may be based on a precoding rule used by the transmitter, among other factors. In addition, the transmitter may transmit an indication of the matrix to the receiver, and the receiver may use the one or more PDP autocorrelation values and the matrix to identify a set of multiple b-coefficients for use in the DPoD procedure. The receiver may then use the b-coefficients in the DPoD procedure.

Aspects of the disclosure are initially described in the context of wireless communications systems. Aspects of the disclosure are then described in the context of DPoD models, coefficient calculations, and process flows. Aspects of the disclosure are further illustrated by and described with reference to apparatus diagrams, system diagrams, and flowcharts that relate to calculating coefficients in low-complexity DPoD procedures.

FIG. 1 shows an example of a wireless communications system 100 that supports calculating coefficients in low-complexity DPoD procedures in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support calculating coefficients in low-complexity DPoD procedures as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

A transmitter (e.g., a network entity 105) may transmit signals at powers close to a PA compression point. This may increase power efficiency, however the signals output from a PA may be distorted due to non-linearities associated with the PA. In such cases, a receiver (e.g., a UE 115) may use DPoD techniques to reconstruct and subtract non-linearities from the received signals in an iterative manner. DPoD techniques may enable transmitters to transmit at higher powers while improving a signal-to-noise (SNR), signaling capacity, and power consumption efficiency (measured in bits/Joule).

The wireless communications system 100 may support techniques for calculating coefficients in low-complexity, DPoD models to reduce non-linearities in signals transmitted through a PA. Specifically, the techniques described herein may support generating the b-coefficients that may be applied to identify and remove the non-linearities at a UE 115 (e.g., a receiver) without requiring the receiver to have knowledge of precoding used by a transmitter (e.g., a network entity 105). In some examples, a UE 115 or a network entity 105 may determine the b-coefficients based on multiplying a fixed matrix with a vector representative of one or more autocorrelation values of a PDP for a transmitted signal. The UE 115 or the network entity 105 may determine the autocorrelation values, and the network entity 105 may determine the matrix based on a precoding rule used by the network entity 105 and in some cases, indicate the matrix to the UE 115. Because the matrix may be associated with the precoder rule but is not explicitly the precoder rule itself, the network entity 105 may refrain from indicating the precoder rule.

The UE 115 and the network entity 105 may support two alternatives for determine the b-coefficients. For example, in some cases, the UE 115 may determine (e.g., measure) an autocorrelation value for a PDP associated with a received signal. The UE 115 may forward the autocorrelation value to the network entity 105, and the network entity 105 may then select an appropriate matrix based on a precoding rule and multiply the matrix with the autocorrelation value to determine the b-coefficients. The network entity 105 may return the resulting b-coefficients to the UE 115 for use in the DPoD procedure. Alternatively, the network entity 105 may estimate an autocorrelation value and forward the autocorrelation value and the matrix to the UE 115 such that the UE 115 may multiply the autocorrelation value and the matrix to determine the b-coefficients for use in the DPoD procedure.

Figure 2:
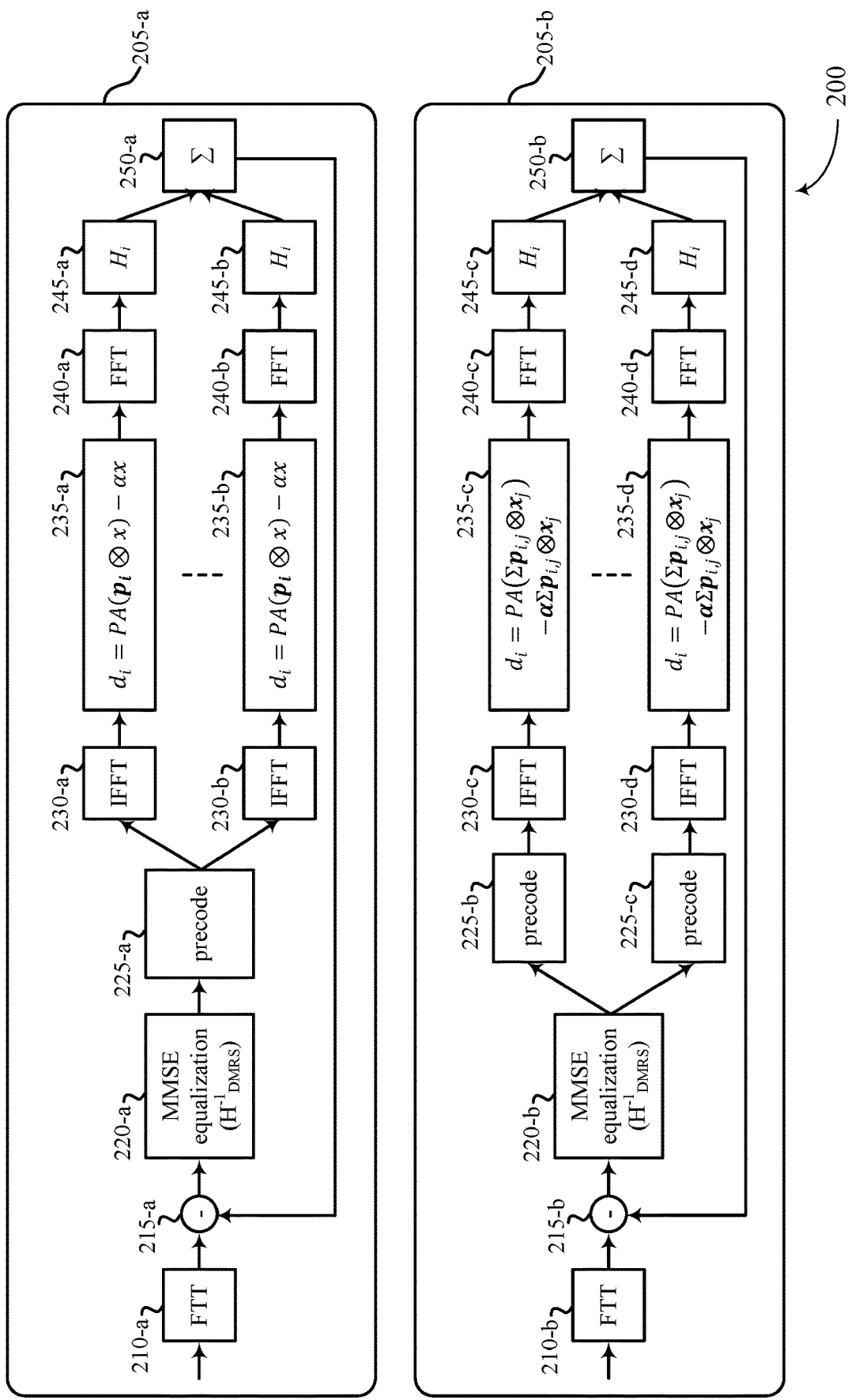
FIG. 2 shows an example of a DPoD model that supports calculating coefficients in low-complexity DPoD procedures in accordance with one or more aspects of the present disclosure.

FIG. 2 shows an example of a DPoD model 200 that supports calculating coefficients in low-complexity DPoD procedures in accordance with one or more aspects of the present disclosure. In some examples, the DPoD model 200 may implement aspects of the wireless communications system 100 or may be implemented by aspects of the wireless communications system 100. For example, a network entity 105 (e.g., a transmitter) may transmit signals at powers close to a PA compression point. This may increase power efficiency, however the signals output from a PA may be distorted due to non-linearities associated with the PA. In such cases, a UE 115 (e.g., a receiver) may utilize a DPoD model 205-a or a DPoD model 205-b (variations of a DPoD model 200) to reconstruct and subtract non-linearities from the received signals in an iterative manner.

Wireless devices (e.g., network entities 105, UEs 115, and other transmitters and receivers) may use DPoD techniques for use cases of varying complexity. For example, as the wireless devices may use DPoD techniques to compensate for non-linearities in a PA, the DPoD techniques may become more complex with multiple PAs and multiple corresponding channels. Network entities 105 and UEs 115 may use existing DPoD techniques for low-complexity cases such as use-cases for single-layer transmissions with no precoding and a single transmit antenna (which may be associated with an arbitrary PA model). Low-complexity use cases may also include single-layer transmissions with wideband precoding (e.g., scalar per antenna, $p_i$, phase only change) and any quantity of transmit antennas. Such cases may be associated with limited PA models (e.g., memoryless, identical, amplitude modulation (AM)-AM or AM-phase modulation (PM) models with non-linearities dominated by $|x|^2x$ applicable for lightly-compressed Pas, where x represents time-varying data) and may be applicable to demodulation reference signal (DMRS)-based channels. Low-complexity use cases may also include and single user MIMO (SU-MIMO) (multiple-layer) transmissions with no precoding and a quantity $N_{layers}$ transmit antennas (e.g., $N_{Tx}=N_{Rx}=N_{layers}$), which may be associated with an arbitrary PA model and which may assume a minimum mean-squared error (MMSE) equalization acceptable in low antenna correlation conditions).

Alternatively, existing DPoD techniques may support some moderately-complex use cases including single-layer transmissions with frequency selective precoding and one transmit antenna (which may be associated with an arbitrary PA model and may require some precoding knowledge at the UE 115) and SU-MIMO transmissions with wideband precoding or frequency selective precoding and a quantity $N_{layers}$ transmit antennas (e.g., $N_{Tx}=N_{Rx}=N_{layers}$), which may be associated with an arbitrary PA model, require some precoding knowledge, and require a raw channel estimation with $H_{raw}=H_{DMRS}P^{-1}$.

Some use cases may be overly complex for current DPoD techniques. For example, single-layer transmissions with frequency selective precoding and many transmit antennas (e.g., in a beamforming scenario) and SU-MIMO transmissions with wideband or frequency selective precoding and many transmit antennas may be high complexity use cases (associated with an arbitrary PA model) that require precoding knowledge and data-aided raw channel estimation per antenna. In such examples, a network entity 105 may transmit a signal to a UE 115, and the signal may include some non-linear components due to being processed through a non-linear PA. For a single-layer, multiple transmit antenna, and frequency selective precoding use case (e.g., a relatively high-complexity use case), the UE 115 may use the DPoD model 205-a to subtract the non-linearities from the received signal.

A received signal $y_j$, which may include linear and non-linear components, may be a time-domain signal represented in Equation 1.

$$y_j = \sum_i h_{i,j} \otimes PA(p_i \otimes x) = \sum_i h_{ij} \otimes (\alpha(p_i \otimes x) + h_{i,j} \otimes d_i(p_i \otimes x)) = \quad (1)$$
$$h_{DMRS,j} \otimes x + \sum_i h_{i,j} \otimes d_i(p_i \otimes x)$$

In Equation 1, x may represent time-varying data (which is input to a fast Fourier transform (FFT) 210-a at the beginning of the DPoD model 205-a), $p_i$ may represent a frequency-selective precoding in the time domain for transmit antenna i, PA may represent a non-linear function or component corresponding to the PA used by the network entity 105, and $h_{i,j}$ may represent a communication channel between an ith receive antenna and a jth transmit antenna. The received signal $y_j$ may be the summation of linear components of data from each transmit antenna. Term $h_{DMRS,j}\otimes_x$ may represent linear components of the received signal, where $h_{DMRS,j}$ may represent a precoded channel that may be estimated based on DMRSs of the channel. The term $\Sigma_i h_{i,j}\otimes d_i(p_i\otimes x)$ may represent a non-linear components (e.g., non-linear distortions) of the received signal. To remove the non-linear components from the received signal such that the UE 115 is able to process it, the UE 115 may use the DPoD model 205-a to replicate the non-linear components and subtract them from the received signal.

Using the DPoD model 205-a, the UE 115 may receive a time-domain signal with non-linearities via a receive antenna and convert it to the frequency domain via the FFT 210-a. The UE 115 may apply the FFT 210-a per receive antenna. The UE 115 may use a subtraction 215-a to subtract some non-linear components from the received signal. As the UE 115 may lack knowledge of most of the non-linearities during a first iteration of the DPoD model 205-a, the UE 115 may apply an MMSE equalization ($H^{-1}{}_{DMRS}$) 220-a to remove channel noise from the signal, resulting in an estimate of the data carried in the received signal.

To replicate the non-linear interference (such that it may be subtracted from the received signal), the UE 115 may apply a precoding 225-a to precode the data of the received signal, and apply an inverse FFT (IFFT) 230 to the precoded data to convert the data back to the time domain. After precoding the data, the UE 115 may split its processing of the data per transmit antenna, such that the UE 115 may apply an IFFT 230-a to the data for a first transmit antenna, an IFFT 230-b to the data for a second transmit antenna, and so on. For each transmit antenna i, the UE 115 may the input to a mathematical model 235 of the PA to calculate the non-linear distortion of the data, $d_i$. For example, the UE 115 may apply a mathematical model 235-a for the first transmit antenna, a mathematical model 235-b for the second transmit antenna, and so on. The mathematical model may calculate $d_i$ as $d_i = PA(p_i \otimes x) - \alpha x$, where PA may represent a non-linear function or component of the PA, $p_i$ may represent a frequency-selective precoding represented in the time domain, x may represent the data in the time domain (e.g., time-varying data), and a may represent a gain of the linear component of the PA response. That is, each PA response may be decomposed as $PA(x) = \alpha x + d$ (i.e., a Bussgang decomposition), where d may represent a non-linear distortion and $\alpha$ may represent a linear gain (i.e., a Bussgang coefficient). Based on calculating or estimating $d_i$, the UE 115 may apply an FFT 240 to the data for each transmit antenna (e.g., an FFT 240-a for the first transmit antenna, an FFT 240-b for the second transmit antenna, and so on). In addition, the UE 115 may multiply the data per transmit antenna by a frequency domain channel $H_i$ 245 (e.g., a channel $H_i$ 245-a for the first transmit antenna, a channel $H_i$ 245-b for the second transmit antenna, and so on), which may be unknown.

The UE 115 may sum the non-linearities calculated for each transmit antenna using a summation 250-a to obtain a non-linear interference, and then the UE 115 may subtract the sum from the original received signal. This may result in a cleaner, more linear received signal, such that when the UE 115 repeats these steps in subsequent iterations, the estimates of the non-linearities may improve. As such, the UE 115 may perform iterations of the DPoD model 205-a until the resulting received signal includes only a linear component (or as few non-linearities as possible), which the UE 115 may process.

However, the DPoD model 205-a may have some limitations. For example, because the IFFTs 230, the mathematical models 235, the FFTs 240, and the channels $H_i$ 245 are applied per transmit antenna, the complexity of the DPoD model 205-a may increase proportionally with the quantity of transmit antennas. In addition, because of the term $h_{DMRS,j}$ of Equation 1 (corresponding to the signal that is input to the DPoD model 205-a), the UE 115 may be required to have some knowledge of channel precoding $p_i$ per antenna, which may result in the transmitted communicating excessive side information to the UE 115. The channel components of Equation 1 and the DPoD model 205-a may also require a raw channel estimation (before precoding and per antenna), which may be unavailable at the UE 115.

Alternatively, for a multiple-layer, multiple transmit antenna, and frequency selective precoding use case (e.g., a relatively high-complexity use case), the UE 115 may use the DPoD model 205-b to subtract the non-linearities from the received signal $y_j$, which may be represented as a time-domain signal as shown in Equation 2.

$$y_r = \sum_i h_{i,r} \otimes PA\left(\sum_j p_{i,j} \otimes x_j\right) = \qquad (2)$$

$$\sum_i h_{i,r} \otimes \left(\alpha\left(\sum_j p_{i,j} \otimes x_j\right) + d_i\left(\sum_j p_{i,j} \otimes x_j\right)\right) =$$

$$\sum_j h_{DMRS,r} \otimes x_j + \sum_i h_{i,r} \otimes d_i\left(\sum_j p_{i,j} \otimes x_j\right)$$

In Equation 2, $x_j$ may represent time-varying data received by a receive antenna j (which is input to an FFT 210-b at the beginning of the DPoD model 205-b), $p_{i,j}$ may represent a frequency-selective precoding in the time domain for transmit antenna i and a receive antenna j, PA may represent a non-linear function or component corresponding to the PA used by the network entity 105, and $h_{i,r}$ may represent a communication channel between a receive antenna i and a transmit antenna r. The received signal $y_r$ may be the summation of linear components of data from each transmit antenna. Term $\Sigma_j h_{DMRS,r} \otimes x_j$ may represent linear components of the received signal, where $h_{DMRS,r}$ may represent a precoded channel that may be estimated based on DMRSs of the channel. The term $\Sigma_i h_{i,r} \otimes d_i(\Sigma_j p_{i,j} \otimes x_j)$ may represent a non-linear components (e.g., non-linear distortions) of the received signal. To remove the non-linear components from the received signal such that the UE 115 is able to process it, the UE 115 may use the DPoD model 205-b to replicate the non-linear components and subtract them from the received signal.

Using the DPoD model 205-b, the UE 115 may receive a time-domain signal with non-linearities via a receive antenna and convert it to the frequency domain via an FFT 210-b. The UE 115 may apply the FFT 210-b per receive antenna. The UE 115 may use a subtraction 215-b to subtract some non-linear components from the received signal. As the UE 115 may lack knowledge of most of the non-linearities during a first iteration of the DPoD model 205-b, the UE 115 may apply an MMSE equalization ($H^{-1}_{DMRS}$) 220-b to remove channel noise from the signal, resulting in an estimate of the data carried in the received signal.

To replicate the non-linear interference (such that it may be subtracted from the received signal), the UE 115 may first apply a precoding 225 to precode the data of the received signal. At this point, the UE 115 may split its processing of the data per transmit antenna, such that the UE 115 may apply a precoding 225-b to a first transmit antenna, a precoding 225-c to a second transmit antenna, and so on. In addition, the UE 115 may apply an IFFT 230 to the precoded data per transmit antenna to convert the data back to the time domain (e.g., an IFFT 230-c to the data for a first transmit antenna, an IFFT 230-d to the data for a second transmit antenna, and so on). For each transmit antenna i, the UE 115 may the input to a mathematical model 235 of the PA to calculate the non-linear distortion of the data, $d_i$. For example, the UE 115 may apply a mathematical model 235-c for the first transmit antenna, a mathematical model 235-d for the second transmit antenna, and so on. The mathematical model may calculate $d_i$ as $d_i = PA(\Sigma p_{i,j} \otimes x_j) - \alpha \Sigma p_{i,j} \otimes x_j$, where PA may represent a non-linear function or component of the PA, $p_{i,j}$ may represent a frequency-selective precoding represented in the time domain, $x_j$ may represent the data in the time domain (e.g., time-varying data), and a may represent a gain of the linear component of the PA response. That is, each PA response may be decomposed as $PA(x) = \alpha x + d$, where d may represent a non-linear distortion and a may represent a linear gain. Based on calculating or estimating $d_i$, the UE 115 may apply an FFT 240 to the data for each transmit antenna (e.g., an FFT 240-c for the first transmit antenna, an FFT 240-*d* for the second transmit antenna, and so on). In addition, the UE 115 may multiply the data per transmit antenna by a frequency domain channel $H_i$ 245 (e.g., a channel $H_i$ 245-*c* for the first transmit antenna, a channel $H_i$ 245-*d* for the second transmit antenna, and so on), which may be unknown.

The UE 115 may sum the non-linearities calculated for each transmit antenna using a summation 250-*b* to obtain a non-linear interference, and then the UE 115 may subtract the sum from the original received signal. This may result in a cleaner, more linear received signal, such that when the UE 115 repeats these steps in subsequent iterations, the estimates of the non-linearities may improve. As such, the UE 115 may perform iterations of the DPoD model 205-*b* until the resulting received signal includes only a linear component (or as few non-linearities as possible), which the UE 115 may process. However, the DPoD model 205-*b* may have some limitations similar to that of the DPoD model 205-*a*. For example, because the precoding 225, the IFFTs 230, the mathematical models 235, the FFTs 240, and the channels $H_i$ 245 are applied per transmit antenna, the complexity of the DPoD model 205-*b* may increase proportionally with the quantity of transmit antennas. In addition, the DPoD model 205-*b* may require the UE 115 to have knowledge of precoders or a precoding rule used by the network entity 105 per transmit antenna and the DPoD model 205-*b* may require a raw channel estimation (before the precoding and per transmit antenna).

To overcome the limitations of the DPoD models 205, transmitters and receivers may utilize lower-complexity DPoD models for single layer transmissions. Processing loads of such DPoD models may be independent of a quantity of transmit antennas and instead may rely on a quantity of layers, which may reduce complexity. In addition, such DPoD models may not require the UE 115 to have knowledge of precoders or a precoding rule the network entity 105 used or raw channel information (e.g., information about the channel before precoding).

Instead of the processing depicted in the DPoD model 205-*a* and the DPoD model 205-*b*, lower-complexity DPoD models may involve calculating an expected interference (e.g., non-linearities in the received signal) instead of an exact interference. That is, as the quantity of transmit antennas at the network entity 105 increases, the interference or non-linearities may approach an average or fixed value, such that the UE 115 may rely on the expected interference assuming that the quantity of transmit antennas is large. This may allow the UE 115 to replicate and remove most of the interference in a simpler way without knowing information about the un-coded channel and the precoding. In some examples, the UE 115 may calculate the expected interference at a time t as $E[I(t)]$ as $E[I(t)]=\Sigma |x(t+n)|^2 x(t) B(n)$, where x may represent a time-domain signal representative of data, t may represent an index in time, n may represent a sample, and B(n) may represent a coefficient (also referred to herein as a b-coefficient) which be applied to identify and remove the non-linearities at the UE 115. In such cases, the network entity 105 may calculate and signal B(n) to the UE 115. B(n) may depend on a quantity of receive antennas at the UE 115, a quantity of transmit antennas at the network entity 105, a precoding rule (e.g., singular value decomposition (SVD)), precoding from a codebook, random precoding, etc.), a correlation between antennas, a PDP associated with the communication channel, or any combination thereof. That is, B(n) may depend on long-term factors of the channel, such as the PDP, which the UE 115 may know or calculate in advance, thus, removing the process of estimating the channel per transmit antenna.

Using the estimated interference $E[I(t)]$ (and based on the b-coefficients B(n)), the UE 115 may perform a DPoD procedure by replicating and cancelling an expected non-linear interference from a received signal in the time-domain, applying an FFT to convert the signal to the frequency domain, perform an MMSE equalization $(H^{-1}_{DMRS})$ to remove channel noise from the signal, convert the signal back to the time domain by applying an IFFT, and use the modified signal to calculate $E[I(t)]$ using b-coefficients signaled to the UE 115 by the network entity. The UE 115 may subtract the expected interference $E[I(t)]$ from the received signal and repeat the DPoD process iteratively to further improve the linearity of the received signal.

In some examples, the UE 115 may use a procedure for numeric DPoD interference cancellation to calculate the average non-linear interference (e.g., an ergodic average) instead of an expected or actual interference (e.g., an expectation calculation). In such cases, the network entity 105 may generate one or more random channels with a known PDP or a mixture of known PDPs. The network entity 105 may generate a precoding (using a precoding rule) that is optimized per channel realization. In some cases, the network entity 105 may generate a set of random data and create N kernels, where an nth kernel may be of the form $K(n)=|x(t+n)|^2 x(t)$, where K(n) may represent the nth kernel, x may represent the data, and t may represent a time. The network entity 105 may use other kernels for more complex channel models, interference terms, or a combination thereof.

In some examples, the UE 115 may calculate the interference I(x) (e.g., for a single layer), which may be represented as $I(x)=\Sigma_i \Sigma_m h_i(m) \Sigma_{n_1} p_i(n_1) x(t-n_1-m) \Sigma_{n_2} p_i(n_2) x(t-n_2-m) \Sigma_{n_3} p^*_i(n_3) x^*(t-n_3-m)$, where x may represent the data, $p_i$ may represent a precoding, t may represent a time index, and n and m may represent a layer. The UE 115 may solve a least squares regression to identify coefficients b associated with each kernel using $b=\text{argmin} |[K(0) \ldots K(N-1)]b-I(x)|^2$, and the interference may be calculated as $I(x)=\Sigma_n K(n) b(n)$. The coefficients b may enable the linear combination of the kernels to be used in the least squares calculation to calculate the interference. However, this procedure requires the network entity to signal PDPs for corresponding channels, a precoding rule, and the set of kernels for use in the interference calculation. This may result in high complexity and requires the UE 115 to have knowledge of the precoding rule, which the network entity 105 may rather keep proprietary (and refrain from sharing).

Such DPoD models that are based on calculating the expected non-linear interference $E[I(t)]$ may introduce additional limitations. For example, the analytical calculation of B(n) may be difficult and intractable in many cases, and the numeric calculation of B(n) may be a highly complex calculation that may be challenging for the UE 115. For example, the calculation of B(n) may require matrix inversion of very large matrices, and may occur each time a PDP associated with the channel changes, which may be on the order of every few hundreds of milliseconds. In addition, the B(n) calculation may require knowledge of a precoding rule used by the network entity 105, however, in many cases, the network entity 105 may desire to keep the details of the precoding rule as proprietary information and thus, may refrain from sharing it with the UE 115.

The techniques described herein support a low-complexity procedure for calculating B(n) for use in a low-complexity DPoD model to improve the limitations of the DPoD model 205-a, the DPoD model 205-b, and other existing DPoD models that rely on calculating the expected non-linear interference. For example, techniques for calculating coefficients in low-complexity, DPoD models to reduce non-linearities in signals transmitted through a PA are described. Specifically, a UE 115 or a network entity 105 may generate the b-coefficients that may be applied to identify and remove the non-linearities at a UE 115 (e.g., a receiver) without requiring the receiver to have knowledge of precoding used by a transmitter (e.g., a network entity 105). In some examples, a UE 115 or a network entity 105 may determine the b-coefficients based on multiplying a fixed matrix with a vector representative of one or more autocorrelation values of a PDP for a transmitted signal. The UE 115 or the network entity 105 may determine the autocorrelation values, and the network entity 105 may determine the matrix based on a precoding rule used by the network entity 105 and in some cases, indicate the matrix to the UE 115. Because the matrix may be associated with the precoder rule but is not explicitly the precoder rule itself, the network entity 105 may refrain from indicating the precoder rule.

The UE 115 and the network entity 105 may support two alternatives for determine the b-coefficients. For example, in some cases, the UE 115 may determine (e.g., measure) an autocorrelation value for a PDP associated with a received signal. The UE 115 may forward the autocorrelation value to the network entity 105, and the network entity 105 may then select an appropriate matrix based on a precoding rule and multiply the matrix with the autocorrelation value to determine the b-coefficients. The network entity 105 may return the resulting b-coefficients to the UE 115 for use in the DPoD procedure. Alternatively, the network entity 105 may estimate an autocorrelation value and forward the autocorrelation value and the matrix to the UE 115 such that the UE 115 may multiply the autocorrelation value and the matrix to determine the b-coefficients for use in the DPoD procedure. Such techniques may reduce complexity (up to three to four orders of magnitude) compared to the numeric B(n) calculation, enable the UE 115 to generate the b-coefficients without having knowledge of the precoding rule used by the network entity 105, and reduce the amount of required signaling from the network entity 105 to the UE 115.

Figure 3:
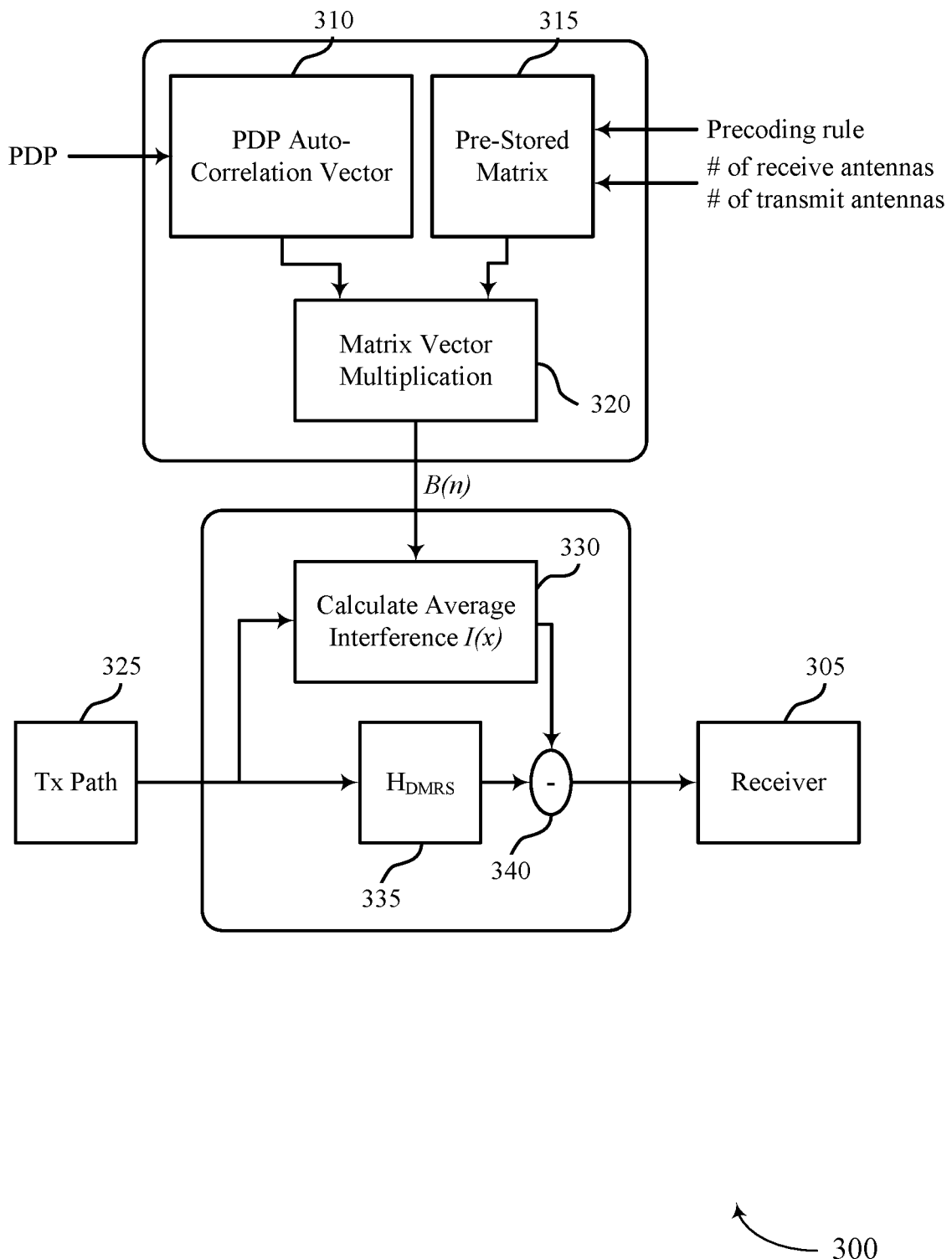
FIG. 3 shows an example of a coefficient calculation that supports calculating coefficients in low-complexity DPoD procedures in accordance with one or more aspects of the present disclosure.

FIG. 3 shows an example of a coefficient calculation 300 that supports calculating coefficients in low-complexity DPoD procedures in accordance with one or more aspects of the present disclosure. In some examples, the coefficient calculation 300 may implement aspects of the wireless communications system 100 or may be implemented by aspects of the wireless communications system 100. For example, a UE 115 (e.g., a receiver 305) may use the coefficient calculation 300 to identify one or more b-coefficients (e.g., B(n)) for use in a DPoD procedure to reduce non-linearities of a received signal. The coefficient calculation 300 may have a relatively low complexity, reduce signaling between the UE 115 and a network entity 105 (e.g., a transmitter), enable the network entity to refrain from sharing its precoding rule with the UE 115, and relax a computational load at the network entity 105.

The UE 115 may receive a signal from a network entity 105 that includes a non-linear component based on the network entity 105 using a non-linear PA. To reduce the transmitter-induced non-linearity component of the received signal, the UE 115 may receive an indication to apply a DPoD procedure to the received signal. For the case of SVD precoding and a single receive antenna (at the UE 115), the vector b(n) representing b-coefficients may depend on a linear combination of PDP autocorrelation values for a PDP of a communication channel associated with the received signal. That is, $b(n)=2 \Sigma_{n_1} \Sigma_{n_2} \sigma^2(n_1)\sigma^2(n_2)S(n_1-n_2=n)+\sigma^4(n)S(n_1=n_2=n=0)$. Use cases with more complex receive antenna diversity may follow the same calculation with different linear combination coefficients. Thus, to calculate the b-vector B(n), the UE 115 or the network entity 105 may calculate a PDP autocorrelation vector 310 (e.g., one or more autocorrelation values for a PDP of the communication channel associated with the received signal), and multiply the PDP autocorrelation vector 310 by a pre-stored matrix 315 (e.g., a fixed matrix) using matrix vector multiplication 320. The pre-stored matrix 315, which may be determined by the network entity 105, may be a function of a precoding rule used by the network entity 105, a quantity of receive antennas (at the UE 115), a quantity of transmit antennas (at the network entity 105), a network entity antenna correlation and topology independent of the PDP, or any combination thereof.

In some examples, the network entity 105 may determine the pre-stored matrix 315 by generating multiple PDPs for one or more communication channels and calculating a b-vector for each of the PDPs using a numerical method and least-squares fitting of the b-vector to the PDP autocorrelation vector 310. The network entity 105 may perform this process once, and the network entity 105 may store different pre-stored matrices 315 (e.g., associated with different quantities of receive antennas, different quantities of transmit antennas, different precoding types). In this way, the network entity 105 and the UE 115 may refrain from performing a high-complexity calculation of the b-vector each time a PDP changes, and the network entity 105 may signal the pre-stored matrix 315 to the UE 115 without explicitly indicating the precoding rule itself.

In some examples, the UE 115 (the receiver 305 as shown in FIG. 3) may measure and signal the PDP autocorrelation vector 310 to the network entity 105 such that the network entity 105 may calculate the b-coefficients. In some examples, the UE 115 may determine the PDP autocorrelation vector 310 based on channel state information (CSI) reference signal (CSI-RS) measurements, where the network entity 105 may dedicate some CSI-RS resources for the PDP autocorrelation measurements. That is, the UE 115 may determine the PDP autocorrelation vector 310 based on measurements of one or more reference signals transmitted by the network entity 105. In some examples, the PDP autocorrelation vector 310 may be based on additional or new reference signals to allow a greater time span estimation of the PDP.

In some cases, the network entity 105 may determine which transmit antennas (or a mixture of one or more antennas) to use for transmitting the CSI-RSs such that the PDP autocorrelation vector 310 reported by the UE 115 may be representative of the communication channel. In such cases, the network entity 105 may transmit, to the UE 115, information indicative of one or more transmit antennas associated with the CSI-RSs or other reference signals, and the UE 115 may determine the PDP autocorrelation vector 310 based on the information. The UE 115 may report (to the network entity 105 for use in calculating the b-coefficients) a single PDP autocorrelation vector 310 that is averaged over all CSI-RS ports dedicated for the DPoD procedure. Alternatively, the UE 115 may report multiple PDP autocorrelation vectors 310, in which case the network entity 105 may specify which transmit antenna groups are to be included in the averaging process for each one of the reported PSP autocorrelation vectors 310. That is, the information indicative of the one or more transmit antennas may indicate an organization of the one or more transmit antennas into one or more transmit antenna groups, where the UE 115 may determine a PDP autocorrelation vector 310 (or at least a PDP autocorrelation value) for each of the one or more transmit antenna groups. The UE 115 may transmit a report indicative of the one or more PDP autocorrelation vectors 310 in accordance with a periodic schedule (e.g., according to a periodicity), a semi-persistent schedule (e.g., semi-persistently), or an aperiodic schedule (e.g., irregularly). In such cases, the network entity 105 may determine the one or more PDP autocorrelation values based on the PDP autocorrelation vector 310 indicated in the report.

In some examples, the network entity 105 may determine the b-coefficients B(n) in response to the report that indicates the PDP autocorrelation vector 310. In some cases, the network entity 105 may transmit information to the UE 115 indicating the set of b-coefficients for use by the UE 115 in the DPoD procedure. That is, the network entity 105 may determine the b-coefficients based on the one or more autocorrelation values in the PDP autocorrelation vector 310 and the pre-stored matrix 315, and the network entity 105 may indicate the b-coefficients to the UE 115 such that the UE 115 may use the b-coefficients in the DPoD procedure.

Alternatively, if the UE 115 is to calculate the b-coefficients B(n), the network entity 105 may signal the pre-stored matrix 315 to the UE 115. For example, the network entity 105 may transmit an RRC message (e.g., a first control message) indicating the pre-stored matrix 315. The pre-stored matrix 315 may be based on a precoding rule used by the network entity 105, a quantity of receive antennas, a quantity of transmit antennas, or a combination thereof, and the UE 115 may use the pre-stored matrix 315 with the one or more PDP autocorrelation vectors 310 to identify the set of b-coefficients. The network entity 105 may transmit the RRC message according to a period or aperiodic schedule.

Additionally, or alternatively, the network entity 105 may indicate multiple pre-stored matrices in the RRC message and indicate a selection of a pre-stored matrix 315 based on rules and corresponding indices in a MAC control element (MAC-CE) or downlink control information (DCI) (e.g., a second control message). That is, the UE 115 may receive a first control message (e.g., an RRC message) that indicates a set of multiple pre-stored matrices and a second control message (e.g., DCI or a MAC-CE) that indicates an index that selects (indicates) a pre-stored matrix 315 of the set of multiple pre-stored matrices. By signaling the pre-stored matrix 315, in which the precoding rule used by the network entity 105 is implicitly embedded, the network entity 105 may refrain from explicitly indicating the precoding rule itself to the UE 115, which may be proprietary information. In addition, indicating the pre-stored matrix 315 allows the network entity 105 to refrain from indicating a quantity of transmit antennas (and their correlation or topology), which may be proprietary information.

In some examples, the UE 115 may signal a quantity of receive antennas it uses such that the network entity 105 may select and signal the correct pre-stored matrix 315 to the UE 115. That is, the UE 115 may transmit an uplink message that indicates the quantity of receive antennas used by the UE 115 to receive the received signal, where the RRC message indicates the pre-stored matrix 315 based on the quantity of receive antennas. In some cases, the uplink message may also indicate an antenna correlation, which the network entity 105 may consider when selecting the pre-stored matrix 315. In some examples, the UE 115 may signal (via an uplink message) multiple quantities of receive antennas and receive multiple pre-stored matrices from the network entity 105 in response (via a control message). That is, the UE 115 may receive a control message that indicates multiple pre-stored matrices, each of the multiple pre-stored matrices usable with the one or more PDP autocorrelation vectors 310 for identifying the set of b-coefficients, each of the pre-stored matrices based on a corresponding precoding rule used by the network entity 105 and on a respective one of the multiple quantities of antennas. As such, the UE 115 may use a pre-stored matrix 315 per quantity of receive antennas. The UE 115 may then dynamically change the quantity of receive antennas and select a pre-stored matrix 315 accordingly, based on a quantity of receive antennas used by the UE 115 to receive the received signal.

Alternatively, the network entity 105 may report an estimated PDP autocorrelation (the PDP autocorrelation vector 310) to the UE 115 to enable the UE 115 to calculate the b-coefficients. In such cases, the UE 115 may receive first information indicative of the PDP autocorrelation vector 310 from the network entity 105. The network entity 105 may estimate the PDP autocorrelation vector 310 from sounding reference signal (SRS) measurements, and the report may include a single PDP autocorrelation vector 310 or multiple PDP autocorrelation vectors 310. If the report includes a list of multiple PDP autocorrelation vectors 310, the network entity 105 may also indicate a weight per PDP, where the weight may represent a percentage of transmit antennas of the network entity 105 for which each of the PDPs may be applicable.

The UE 115 may identify the set of b-coefficients for use in the DPoD procedure based on the one or more PDP autocorrelation vectors 310 indicated by the network entity 105. In addition, the UE 115 may apply the DPoD procedure to the received signal by using the set of b-coefficients to reduce the transmitter-induced non-linearity component of the received signal. The UE 115 may use the b-coefficients B(n) in the DPoD procedure to calculate an average interference 330 (e.g., an average non-linear interference I(x)) associated with the received signal. The average interference calculation may also include data (via a transmit path 325). The data, the average interference 330, and the precoded channel ($H_{DMRS}$) 335 may be subtracted (via a subtraction 340) to output the received signal to the UE 115 (e.g., the receiver 305), which may iteratively subtract the average interference 330 from the received signal to reduce or remove the non-linear component.

Figure 4:
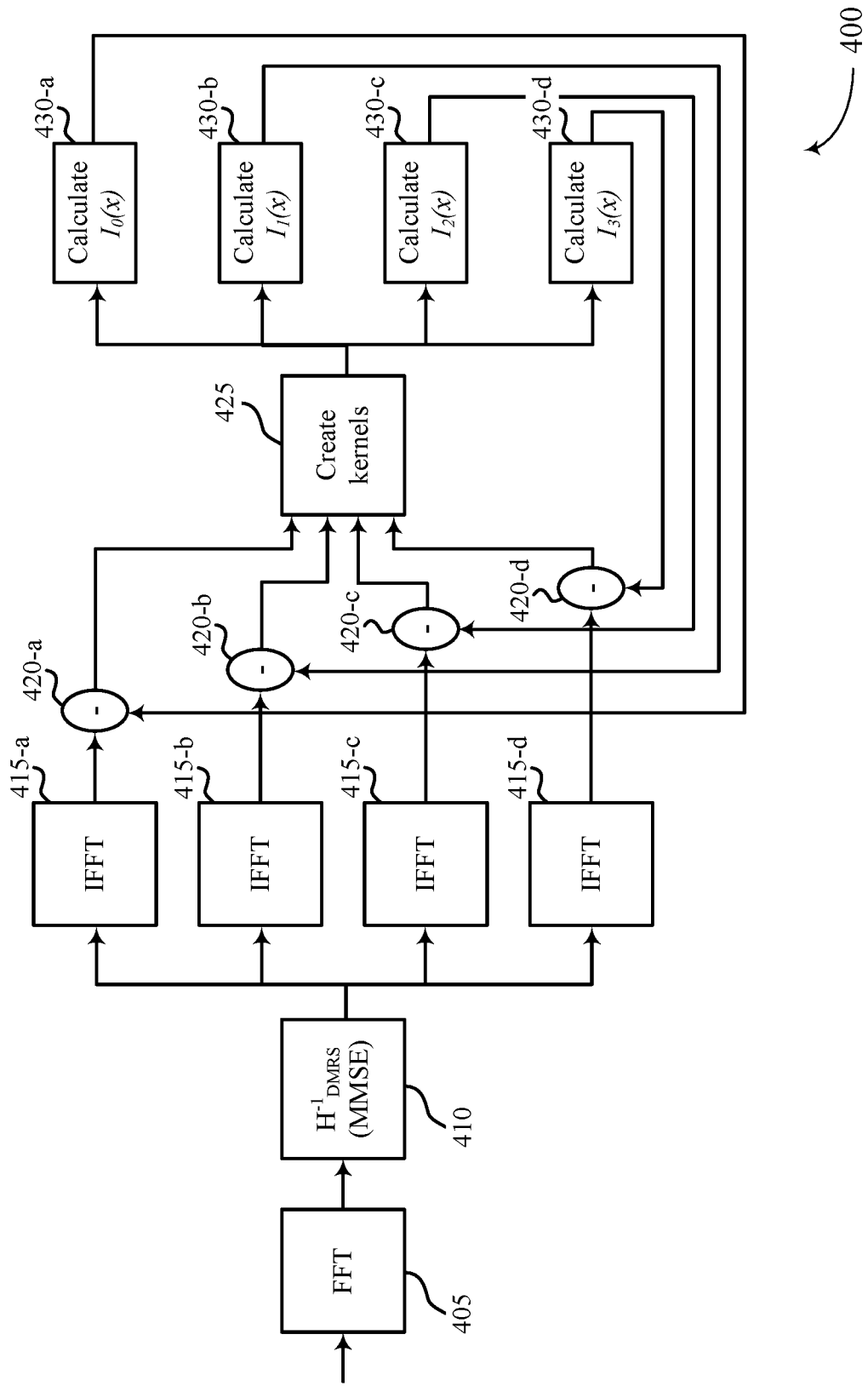
FIG. 4 shows an example of a DPoD model that supports calculating coefficients in low-complexity DPoD procedures in accordance with one or more aspects of the present disclosure.

FIG. 4 shows an example of a DPoD model 400 that supports calculating coefficients in low-complexity DPoD procedures in accordance with one or more aspects of the present disclosure. In some examples, the DPoD model 400 may implement aspects of the wireless communications system 100, the DPoD model 200, and the coefficient calculation 300, or may be implemented by aspects of the wireless communications system 100, the DPoD model 200, and the coefficient calculation 300. For example, a UE 115 (e.g., a receiver) may use the DPoD model 400 to remove transmitter-induced non-linear components of received signals.

A UE 115 may use the techniques described herein with reference to FIG. 3 to calculate a set of b-coefficients B(n) for use in a DPoD procedure. In the example of FIG. 4, the UE 115 may use four receive antennas and four layers. The UE 115 may apply an FFT 405 to a received signal to convert the data to the frequency domain. In addition, the UE 115 may apply an MMSE equalization ($H^{-1}_{DMRS}$) 410 to remove channel noise from the signal, resulting in an estimate of the data carried in the received signal. Then, the UE 115 may apply an IFFT 415 to the data for each layer m to convert the data back to the time domain. For example, the UE 115 may apply an IFFT 415-a for a first receive antenna, an IFFT 415-b for a second receive antenna, an IFFT 415-c for a third receive antenna, and an IFFT 415-d for a fourth receive antenna. The time-domain data for each receive antenna may be used to create kernels 425, where kernel types for calculating the mth layer may be represented as: $|x_0(t+1)|^2 x_m(t)$, $|x_1(t+1)|^2 x_m(t)$, $|x_2(t+1)|^2 x_m(t)$, $|x_3(t+1)|^2 x_m(t)$ for all 1, where 1. may represent an index of a kernel. For such kernels, 1. may have any value in a range of an FFT side, for example, 0 to N−1, where N may represent the FFT size. In the examples described herein, 1. may have all values, such that there may be 4N kernels (4 kernels in the equation per value of l).

After the equalization $H^{-1}_{DMRS}$ and using the kernels 425 and a set of b-coefficients, the UE 115 may calculate an average interference $I_i(x)$ 430 for each layer. For example, the UE 115 may calculate an average interference $I_0(x)$ 430-a for a first layer, an average interference $I_1(x)$ 430-b for a second layer, an average interference $I_2(x)$ 430-c for a third layer, and an average interference $I_4(x)$ 430-d for a fourth layer. The UE 115 may subtract the average interference $I_i(x)$ 430 from the received signal for each corresponding receive antenna using a subtraction 420 (e.g., a subtraction 420-a, 420-b, 420-c, and 420-d for the first receive antenna, the second receive antenna, the third receive antenna, and the fourth receive antenna, respectfully), and thus may reduce the transmitter-induced non-linear component of the received signal that is received via each receive antenna. For example, using the DPoD model 400 and the techniques for calculating the b-coefficients as described herein, the UE 115 may cancel approximately 11.5 dB to 14 dB from the interference for 50% of channel realizations. The UE 115 may use the DPoD model 400 iteratively to further improve the linearity of the received signal.

Figure 5:
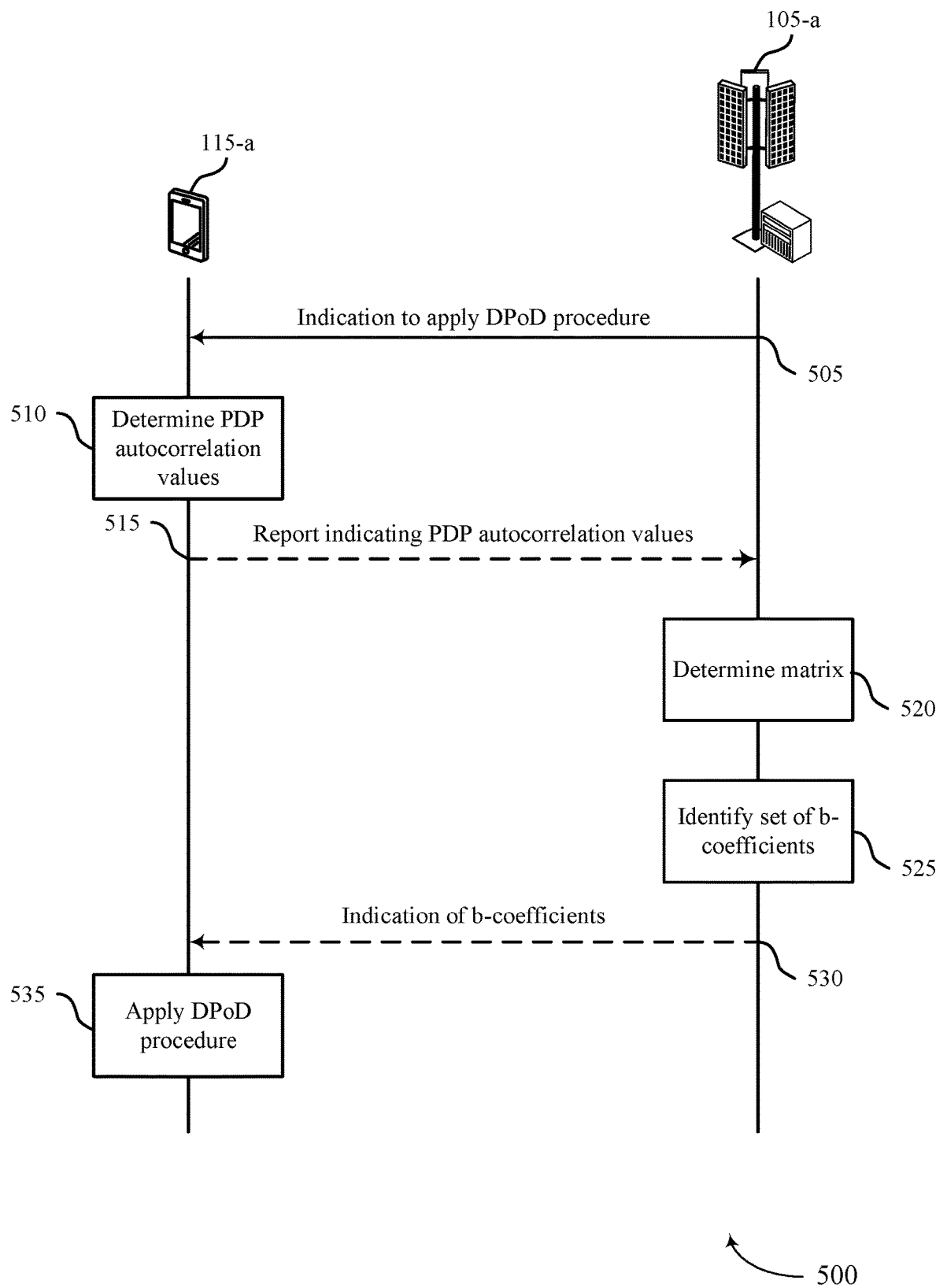
FIGS. 5 and 6 show examples of process flows that support calculating coefficients in low-complexity DPoD procedures in accordance with one or more aspects of the present disclosure.

FIG. 5 shows an example of a process flow 500 that supports calculating coefficients in low-complexity DPoD procedures in accordance with one or more aspects of the present disclosure. The process flow 500 may implement aspects of wireless communications system 100, the DPoD model 200, the coefficient calculation 300, and the DPoD model 400, or may be implemented by aspects of the wireless communications system 100, the DPoD model 200, the coefficient calculation 300, and the DPoD model 400. For example, the process flow 500 may illustrate operations between a UE 115-a (e.g., a receiver) and a network entity 105-a (e.g., a transmitter), which may be examples of corresponding devices described herein. In the following description of the process flow 500, the operations between the UE 115-a and the network entity 105-a may be transmitted in a different order than the example order shown, or the operations performed by the UE 115-a and the network entity 105-a may be performed in different orders or at different times. Some operations may also be omitted from the process flow 500, and other operations may be added to the process flow 500.

At 505, the UE 115-a may receive, from the network entity 105-a, an indication that the UE 115-a is to apply a DPoD procedure to a received signal for reducing a transmitter-introduced non-linearity component of the received signal. That is, the network entity 105-a may transmit a signal to the UE 115-a that was sent through a non-linear PA, thus introducing non-linearities to the signal.

At 510, the UE 115-a may determine one or more autocorrelation values for a PDP of a communication channel associated with the received signal. The UE 115-a may determine the PDP autocorrelation values based on measurements of reference signals transmitted by the network entity 105-a, based on a quantity of transmit antennas associated with the network entity 105-a, or a combination thereof. At 515, the UE 115-a may transmit, to the network entity 105-a, a report indicative of the one or more autocorrelation values.

At 520, the network entity 105-a may determine a matrix for use with the one or more autocorrelation values to identify a set of multiple coefficients (b-coefficients) for use in the DPoD procedure, wherein the matrix is based on a precoding rule used by the network entity 105-a. In some examples, the matrix may additionally, or alternatively, be based on a quantity of receive antennas, a quantity of transmit antennas, network entity antenna correlation and topology, or any combination thereof. The matrix may be independent of the PDP, and may implicitly embed a precoding rule used by the network entity 105-a.

At 525, the network entity 105-a may identify the set of multiple coefficients for use in the DPoD procedure based on the one or more autocorrelation values and the matrix. At 530, the network entity 105-a may transmit, to the UE 115-a and in response to the report, information indicative of the set of multiple coefficients for use in the DPoD procedure.

At 535, the UE 115-a may apply the DPoD procedure to the received signal by using the set of multiple coefficients (e.g., to reduce the transmitter-introduced non-linearity component of the received signal).

Figure 6:
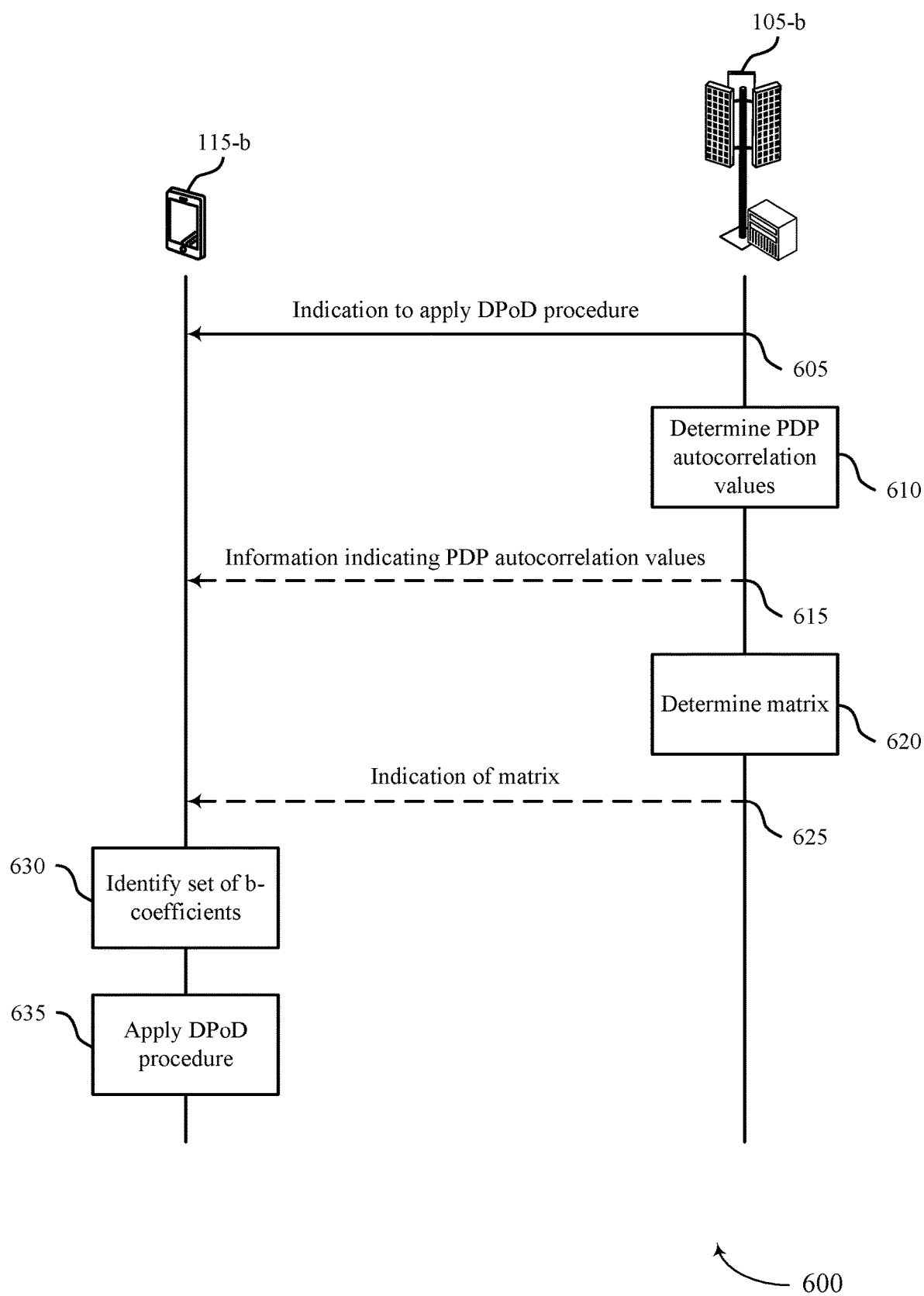

FIG. 6 shows an example of a process flow 600 that supports calculating coefficients in low-complexity DPoD procedures in accordance with one or more aspects of the present disclosure. The process flow 600 may implement aspects of wireless communications system 100, the DPoD model 200, the coefficient calculation 300, and the DPoD model 400, or may be implemented by aspects of the wireless communications system 100, the DPoD model 200, the coefficient calculation 300, and the DPoD model 400. For example, the process flow 600 may illustrate operations between a UE 115-a (e.g., a receiver) and a network entity 105-a (e.g., a transmitter), which may be examples of corresponding devices described herein. In the following description of the process flow 600, the operations between the UE 115-a and the network entity 105-a may be transmitted in a different order than the example order shown, or the operations performed by the UE 115-a and the network entity 105-a may be performed in different orders or at different times. Some operations may also be omitted from the process flow 600, and other operations may be added to the process flow 600.

At 605, the UE 115-b may receive, from the network entity 105-b, an indication that the UE 115-b is to apply a DPoD procedure to a received signal for reducing a transmitter-introduced non-linearity component of the received signal. That is, the network entity 105-b may transmit a signal to the UE 115-b that was sent through a non-linear PA, thus introducing non-linearities to the signal.

At 610, the network entity 105-b may determine one or more autocorrelation values for a PDP of a communication channel associated with the received signal. The network entity 105-b may determine the PDP autocorrelation values based on measurements by the UE 115-b of reference signals transmitted by the network entity 105-b, based on a quantity of transmit antennas associated with the network entity 105-b, or a combination thereof.

At 615, the network entity 105-b may transmit, to the UE 115-b, first information indicative of the one or more autocorrelation values, where the one or more autocorrelation values are estimated with respect to one or more reference signals.

At 620, the network entity 105-b may determine a matrix for use with the one or more autocorrelation values to identify a set of multiple coefficients (b-coefficients) for use in the DPoD procedure, wherein the matrix is based on a precoding rule used by the network entity 105-b. In some examples, the matrix may additionally, or alternatively, be based on a quantity of receive antennas, a quantity of transmit antennas, network entity antenna correlation and topology, or any combination thereof. The matrix may be independent of the PDP, and may implicitly embed a precoding rule used by the network entity 105-b.

At 625, the network entity 105-b may transmit, to the UE 115-b, a first control message that indicates the matrix, where the set of multiple coefficients is identified based on the matrix and the one or more autocorrelation values.

At 630, the UE 115-b may identify the set of multiple coefficients for use in the DPoD procedure based on the one or more autocorrelation values and the matrix. At 635, the UE 115-b may apply the DPoD procedure to the received signal by using the set of multiple coefficients.

Figure 7:
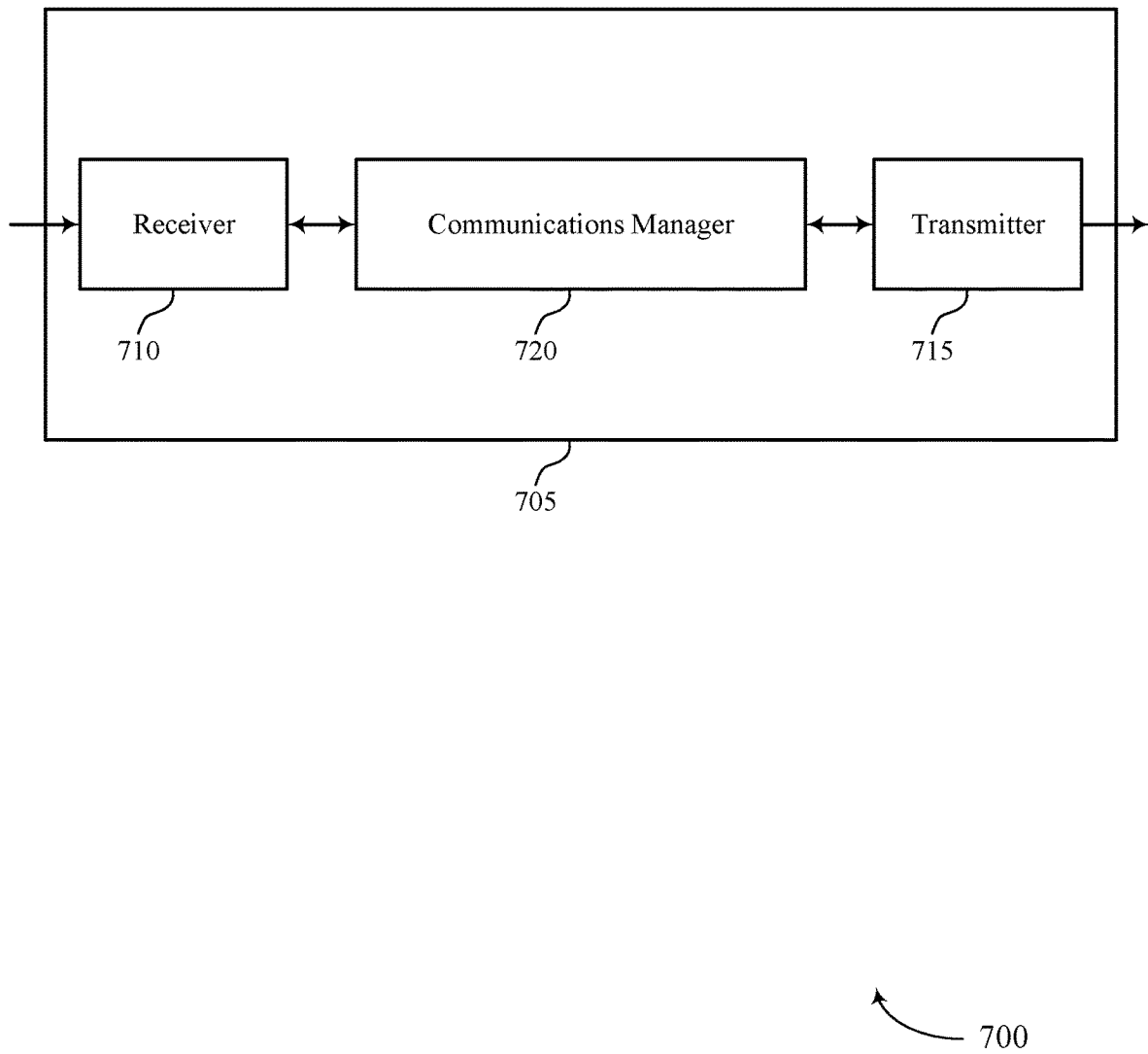
FIGS. 7 and 8 show block diagrams of devices that support calculating coefficients in low-complexity DPoD procedures in accordance with one or more aspects of the present disclosure.

FIG. 7 shows a block diagram 700 of a device 705 that supports calculating coefficients in low-complexity DPoD procedures in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to calculating coefficients in low-complexity DPoD procedures). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to calculating coefficients in low-complexity DPoD procedures). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of calculating coefficients in low-complexity DPoD procedures as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for receiving, from a network entity, an indication that the UE is to apply a DPoD procedure to a received signal for reducing a transmitter-introduced non-linearity component of the received signal. The communications manager 720 is capable of, configured to, or operable to support a means for determining one or more autocorrelation values for a PDP of a communication channel associated with the received signal. The communications manager 720 is capable of, configured to, or operable to support a means for identifying a set of multiple coefficients for use in the DPoD procedure, where the set of multiple coefficients are based on the one or more autocorrelation values. The communications manager 720 is capable of, configured to, or operable to support a means for applying the DPoD procedure to the received signal by using the set of multiple coefficients.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for calculating coefficients in low-complexity DPoD procedures, which may reduce processing, improve utilization of resources, improve communication reliability, relax computational loads, and improve coordination between devices.

Figure 8:
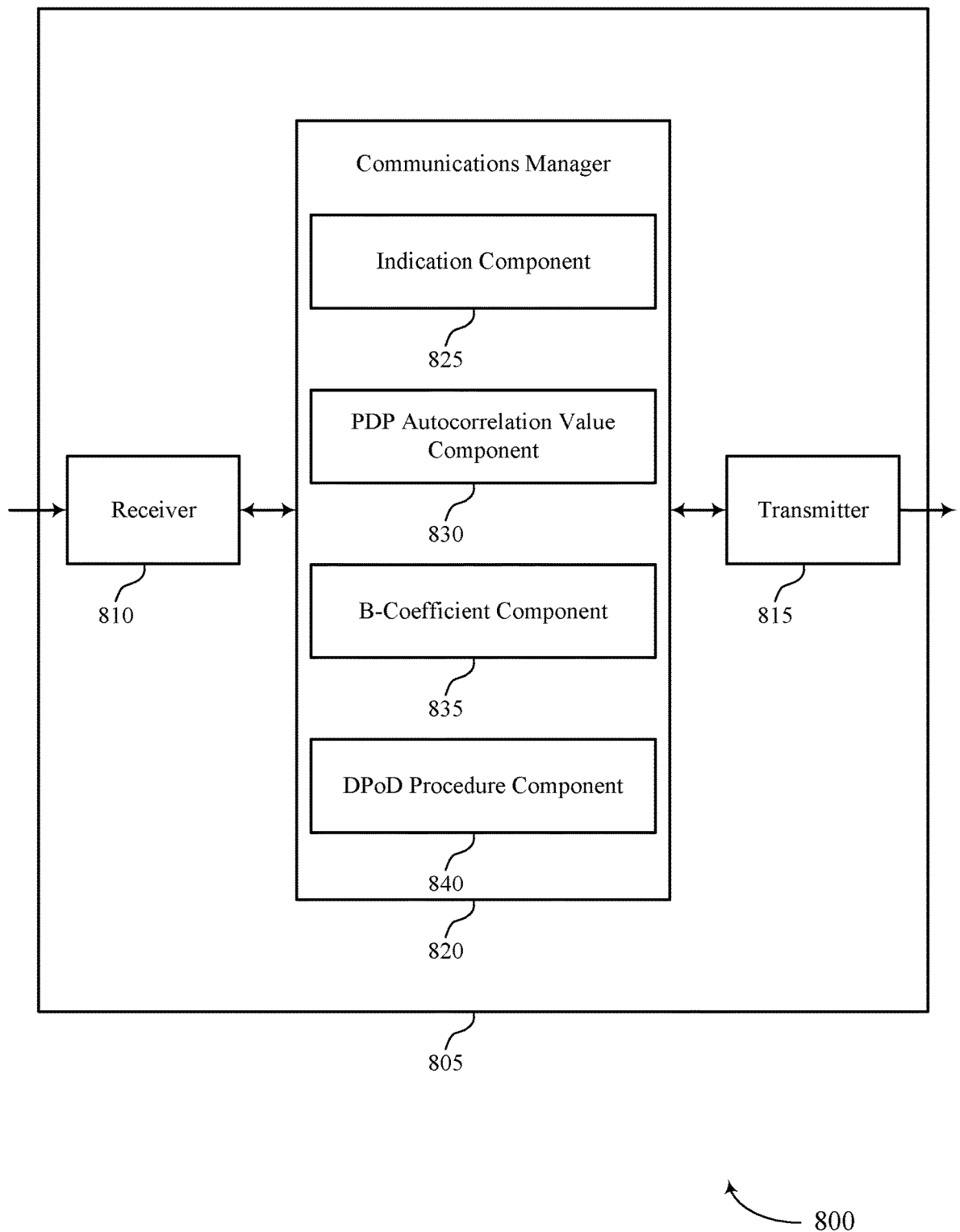

FIG. 8 shows a block diagram 800 of a device 805 that supports calculating coefficients in low-complexity DPoD procedures in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to calculating coefficients in low-complexity DPoD procedures). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to calculating coefficients in low-complexity DPoD procedures). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of calculating coefficients in low-complexity DPoD procedures as described herein. For example, the communications manager 820 may include an indication component 825, a PDP autocorrelation value component 830, a b-coefficient component 835, a DPoD procedure component 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The indication component 825 is capable of, configured to, or operable to support a means for receiving, from a network entity, an indication that the UE is to apply a DPoD procedure to a received signal for reducing a transmitter-introduced non-linearity component of the received signal. The PDP autocorrelation value component 830 is capable of, configured to, or operable to support a means for determining one or more autocorrelation values for a PDP of a communication channel associated with the received signal. The b-coefficient component 835 is capable of, configured to, or operable to support a means for identifying a set of multiple coefficients for use in the DPoD procedure, where the set of multiple coefficients are based on the one or more autocorrelation values. The DPoD procedure component 840 is capable of, configured to, or operable to support a means for applying the DPoD procedure to the received signal by using the set of multiple coefficients.

Figure 9:
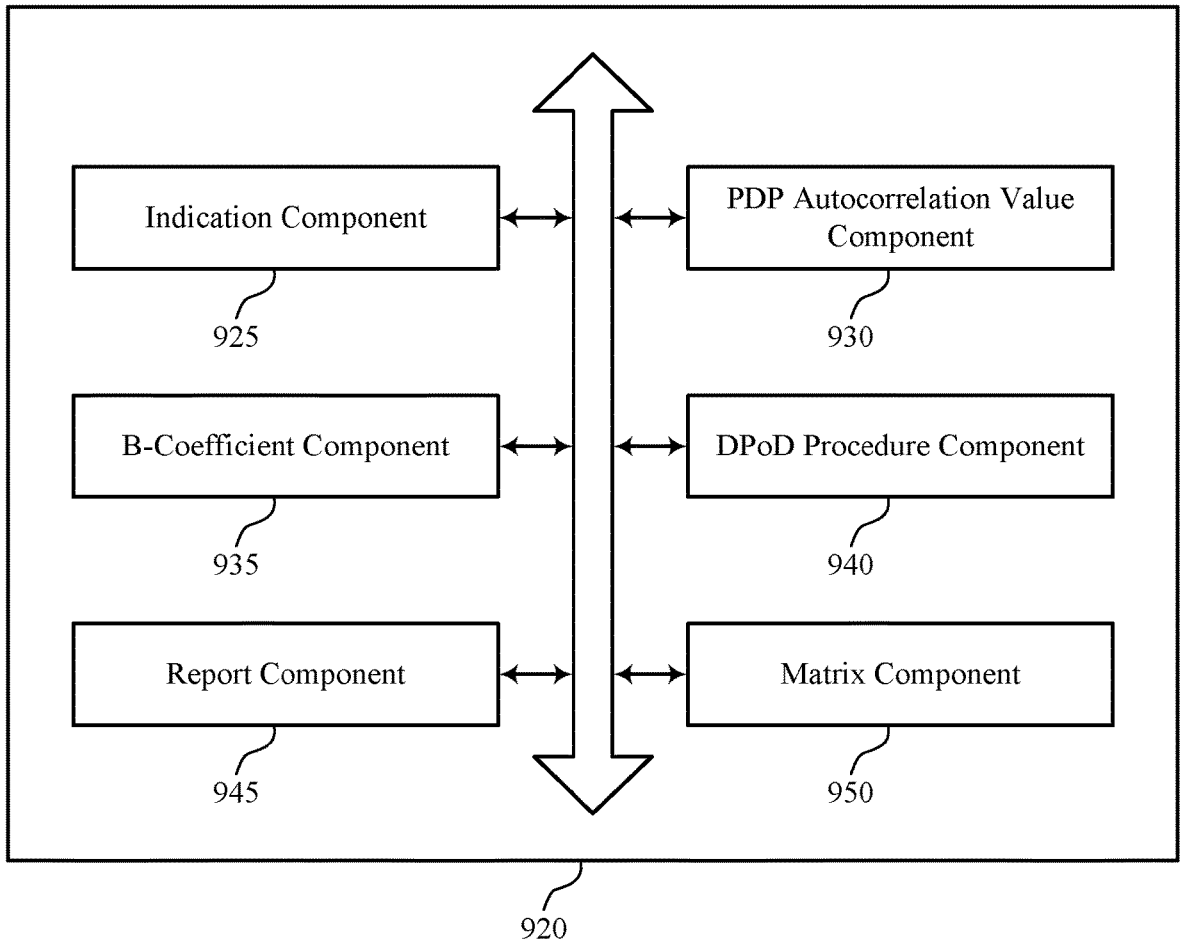
FIG. 9 shows a block diagram of a communications manager that supports calculating coefficients in low-complexity DPoD procedures in accordance with one or more aspects of the present disclosure.

FIG. 9 shows a block diagram 900 of a communications manager 920 that supports calculating coefficients in low-complexity DPoD procedures in accordance with one or more aspects of the present disclosure. The communications manager 920 may be an example of aspects of a communications manager 720, a communications manager 820, or both, as described herein. The communications manager 920, or various components thereof, may be an example of means for performing various aspects of calculating coefficients in low-complexity DPoD procedures as described herein. For example, the communications manager 920 may include an indication component 925, a PDP autocorrelation value component 930, a b-coefficient component 935, a DPoD procedure component 940, a report component 945, a matrix component 950, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The indication component 925 is capable of, configured to, or operable to support a means for receiving, from a network entity, an indication that the UE is to apply a DPoD procedure to a received signal for reducing a transmitter-introduced non-linearity component of the received signal. The PDP autocorrelation value component 930 is capable of, configured to, or operable to support a means for determining one or more autocorrelation values for a PDP of a communication channel associated with the received signal. The b-coefficient component 935 is capable of, configured to, or operable to support a means for identifying a set of multiple coefficients for use in the DPoD procedure, where the set of multiple coefficients are based on the one or more autocorrelation values. The DPoD procedure component 940 is capable of, configured to, or operable to support a means for applying the DPoD procedure to the received signal by using the set of multiple coefficients.

In some examples, to support determining the one or more autocorrelation values for the PDP, the PDP autocorrelation value component 930 is capable of, configured to, or operable to support a means for determining the one or more autocorrelation values for the PDP based on measurements of one or more reference signals transmitted by the network entity.

In some examples, the PDP autocorrelation value component 930 is capable of, configured to, or operable to support a means for receiving, from the network entity, information indicative of one or more transmit antennas associated with the one or more reference signals, where the UE determines the one or more autocorrelation values for the PDP based on the information.

In some examples, to support determining the one or more autocorrelation values, the PDP autocorrelation value component 930 is capable of, configured to, or operable to support a means for determining an average autocorrelation value associated with the one or more transmit antennas indicated by the information.

In some examples, the information indicates organization of the one or more transmit antennas into one or more transmit antenna groups, where the UE determines an autocorrelation value for each of the one or more transmit antenna groups.

In some examples, the report component 945 is capable of, configured to, or operable to support a means for transmitting a report indicative of the one or more autocorrelation values to the network entity. In some examples, the report is transmitted in accordance with a periodic, semi-persistent, or aperiodic schedule.

In some examples, to support identifying the set of multiple coefficients, the b-coefficient component 935 is capable of, configured to, or operable to support a means for receiving, from the network entity and in response to transmission of the report, information indicative of the set of multiple coefficients for use in the DPoD procedure, where the set of multiple coefficients are based on the one or more autocorrelation values and a matrix that is based on a precoding rule used by the network entity.

In some examples, to support determining the one or more autocorrelation values for the PDP, the PDP autocorrelation value component 930 is capable of, configured to, or operable to support a means for receiving, from the network entity, first information indicative of the one or more autocorrelation values.

In some examples, to support receiving the first information indicative of the one or more autocorrelation values, the PDP autocorrelation value component 930 is capable of, configured to, or operable to support a means for receiving a weight associated with each of the set of multiple autocorrelation values for the PDP, where the weight corresponds to a percentage of transmit antennas of the network entity for which each of the set of multiple autocorrelation values is applicable.

In some examples, the matrix component 950 is capable of, configured to, or operable to support a means for receiving a first control message that indicates a matrix, wherein the matrix is based at least in part on a precoding rule used by the network entity, and wherein identification of the plurality of coefficients is based at least in part on the matrix and the one or more autocorrelation values.

In some examples, the matrix component 950 is capable of, configured to, or operable to support a means for receiving a second control message that indicates a set of multiple matrices, where the first control message indicates the matrix from the set of multiple matrices.

In some examples, the matrix component 950 is capable of, configured to, or operable to support a means for transmitting an uplink message that indicates a quantity of antennas used by the UE to receive the received signal, where the matrix indicated by the first control message is based on the quantity of antennas indicated by the UE.

In some examples, the matrix component 950 is capable of, configured to, or operable to support a means for transmitting an uplink message that indicates a set of multiple quantities of antennas available to be used by the UE to receive the received signal. In some examples, the matrix component 950 is capable of, configured to, or operable to support a means for receiving a control message that indicates a set of multiple matrices, each of the set of multiple matrices usable with the one or more autocorrelation values for identifying the set of multiple coefficients, each of the set of multiple matrices based on a corresponding precoding rule used by the network entity and on a respective one of the set of multiple quantities of antennas. In some examples, the matrix component 950 is capable of, configured to, or operable to support a means for selecting a matrix from the set of multiple matrices based on a quantity of antennas used by the UE to receive the received signal.

In some examples, the b-coefficient component 935 is capable of, configured to, or operable to support a means for determining the set of multiple coefficients for use in the DPoD procedure based on the one or more autocorrelation values and a matrix that is based on a precoding rule used by the network entity.

In some examples, the matrix is further based on one or more of a first quantity of UE antennas for receipt of the received signal, a second quantity of transmit antennas for transmission of the received signal, or network entity antenna correlation and topology, and where the matrix is independent of the PDP.

Figure 10:
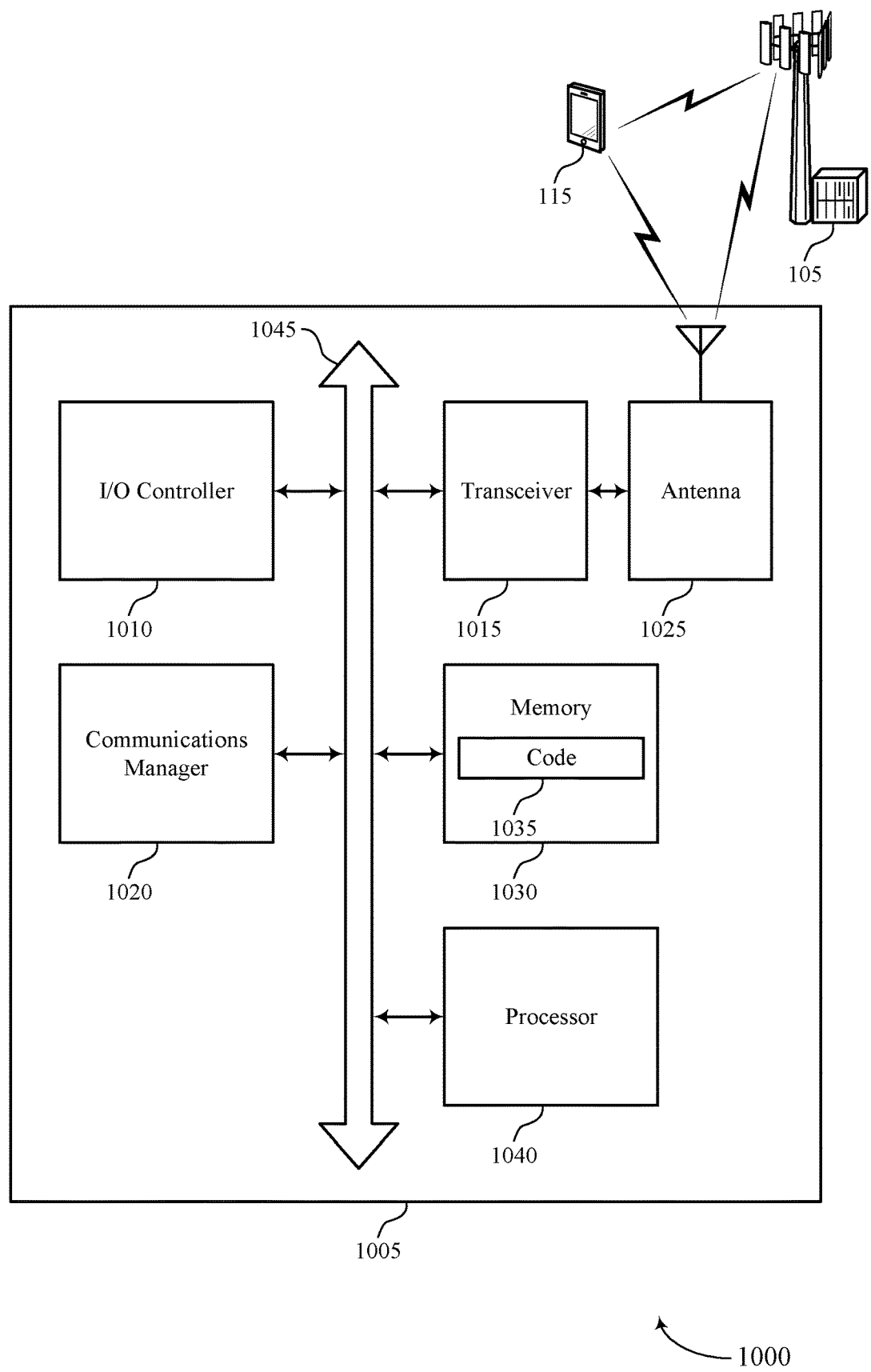
FIG. 10 shows a diagram of a system including a device that supports calculating coefficients in low-complexity DPoD procedures in accordance with one or more aspects of the present disclosure.

FIG. 10 shows a diagram of a system 1000 including a device 1005 that supports calculating coefficients in low-complexity DPoD procedures in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting calculating coefficients in low-complexity DPoD procedures). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein.

The communications manager 1020 may support wireless communications in accordance with examples as disclosed herein. For example, the communications manager 1020 is capable of, configured to, or operable to support a means for receiving, from a network entity, an indication that the UE is to apply a DPoD procedure to a received signal for reducing a transmitter-introduced non-linearity component of the received signal. The communications manager 1020 is capable of, configured to, or operable to support a means for determining one or more autocorrelation values for a PDP of a communication channel associated with the received signal. The communications manager 1020 is capable of, configured to, or operable to support a means for identifying a set of multiple coefficients for use in the DPoD procedure, where the set of multiple coefficients are based on the one or more autocorrelation values. The communications manager 1020 is capable of, configured to, or operable to support a means for applying the DPoD procedure to the received signal by using the set of multiple coefficients.

By including or configuring the communications manager 1020 in accordance with examples as described herein, the device 1005 may support techniques for calculating coefficients in low-complexity DPoD procedures, which may reduce processing, improve utilization of resources, improve communication reliability, relax computational loads, and improve coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of calculating coefficients in low-complexity DPoD procedures as described herein, or the at least one processor 1040 and the at least one memory 1030 may be otherwise configured to, individually or collectively, perform or support such operations.

Figure 11:
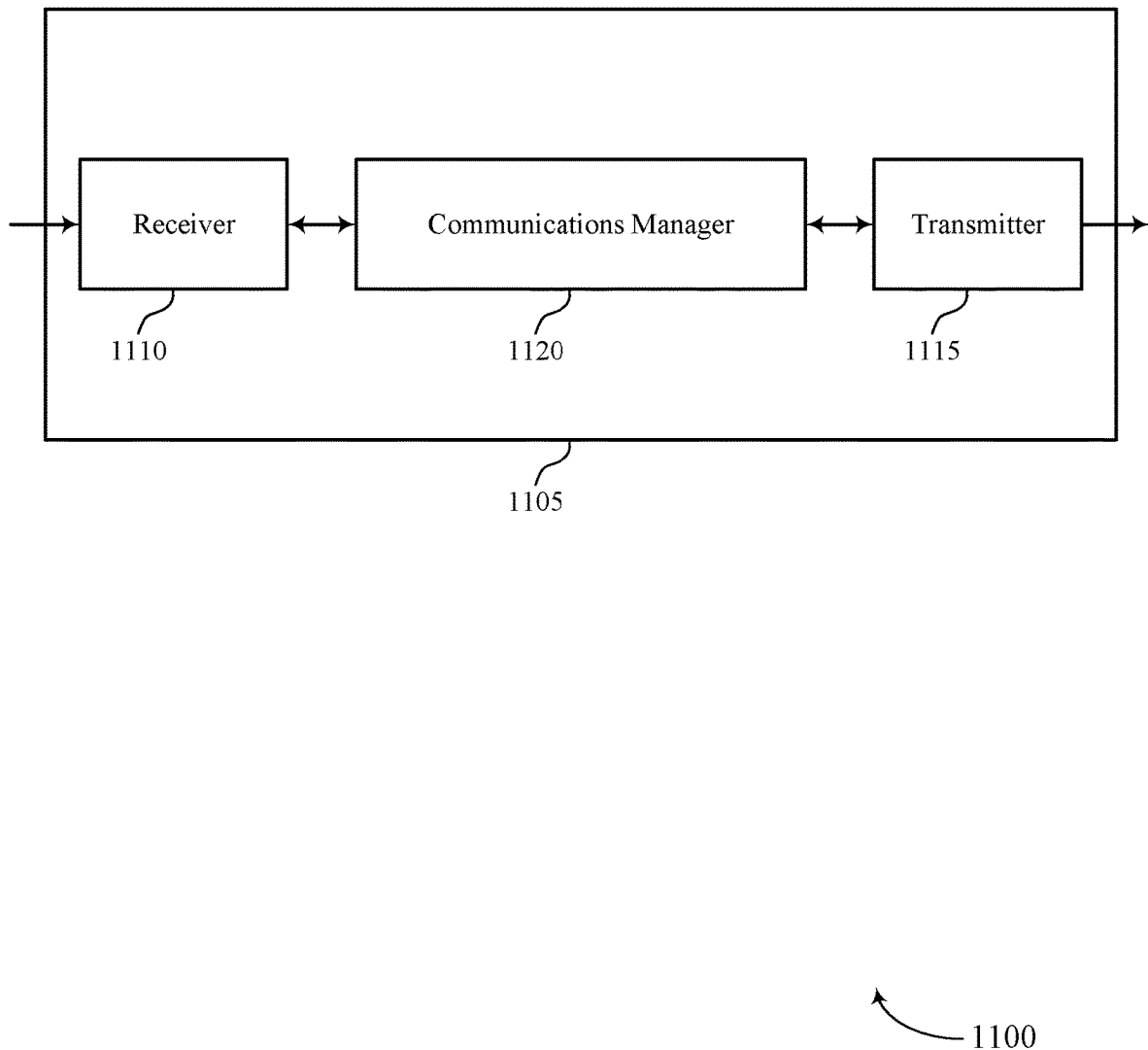
FIGS. 11 and 12 show block diagrams of devices that support calculating coefficients in low-complexity DPoD procedures in accordance with one or more aspects of the present disclosure.

FIG. 11 shows a block diagram 1100 of a device 1105 that supports calculating coefficients in low-complexity DPoD procedures in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of calculating coefficients in low-complexity DPoD procedures as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for transmitting an indication that a UE is to apply a DPoD procedure to a received signal in order to reduce a transmitter-introduced non-linearity component of the received signal. The communications manager 1120 is capable of, configured to, or operable to support a means for determining one or more autocorrelation values for a PDP of a communication channel associated with the received signal. The communications manager 1120 is capable of, configured to, or operable to support a means for determining a matrix for use with the one or more autocorrelation values to identify a set of multiple coefficients for use in the DPoD procedure, where the matrix is based on a precoding rule used by the network entity.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for calculating coefficients in low-complexity DPoD procedures, which may reduce processing, improve utilization of resources, improve communication reliability, relax computational loads, and improve coordination between devices.

Figure 12:
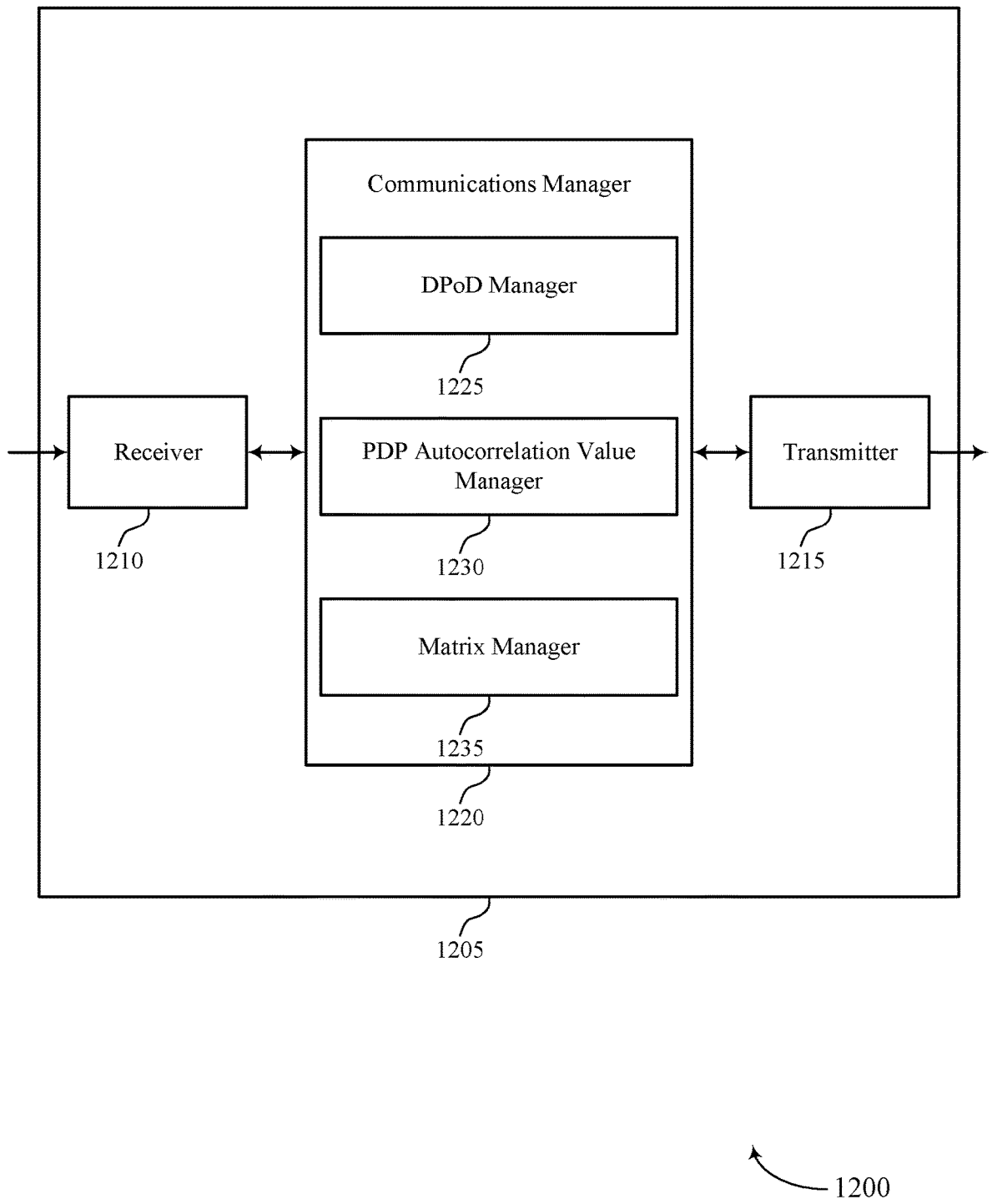

FIG. 12 shows a block diagram 1200 of a device 1205 that supports calculating coefficients in low-complexity DPoD procedures in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of calculating coefficients in low-complexity DPoD procedures as described herein. For example, the communications manager 1220 may include a DPoD manager 1225, a PDP autocorrelation value manager 1230, a matrix manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The DPoD manager 1225 is capable of, configured to, or operable to support a means for transmitting an indication that a UE is to apply a DPoD procedure to a received signal in order to reduce a transmitter-introduced non-linearity component of the received signal. The PDP autocorrelation value manager 1230 is capable of, configured to, or operable to support a means for determining one or more autocorrelation values for a PDP of a communication channel associated with the received signal. The matrix manager 1235 is capable of, configured to, or operable to support a means for determining a matrix for use with the one or more autocorrelation values to identify a set of multiple coefficients for use in the DPoD procedure, where the matrix is based on a precoding rule used by the network entity.

Figure 13:
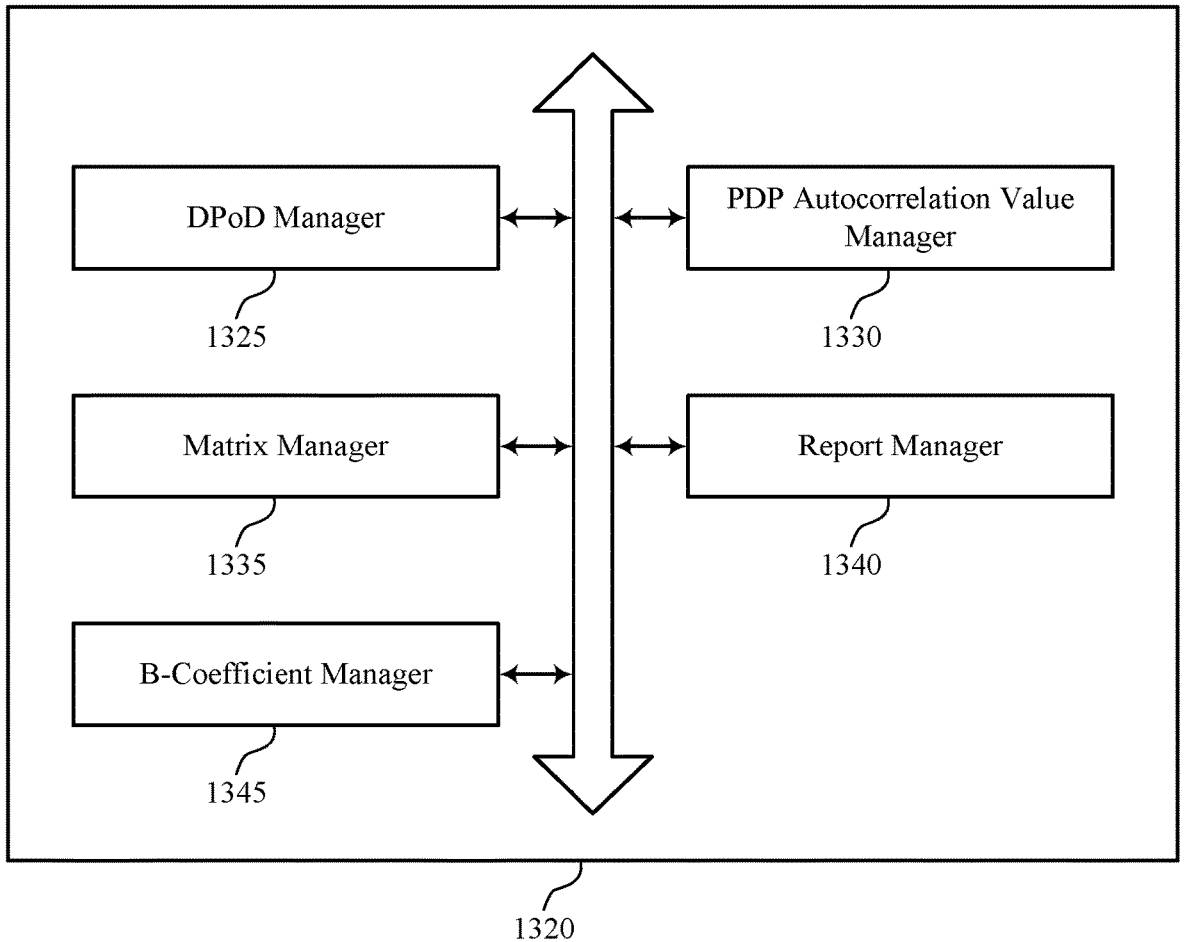
FIG. 13 shows a block diagram of a communications manager that supports calculating coefficients in low-complexity DPoD procedures in accordance with one or more aspects of the present disclosure.

FIG. 13 shows a block diagram 1300 of a communications manager 1320 that supports calculating coefficients in low-complexity DPoD procedures in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of calculating coefficients in low-complexity DPoD procedures as described herein. For example, the communications manager 1320 may include a DPoD manager 1325, a PDP autocorrelation value manager 1330, a matrix manager 1335, a report manager 1340, a b-coefficient manager 1345, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The DPoD manager 1325 is capable of, configured to, or operable to support a means for transmitting an indication that a UE is to apply a DPoD procedure to a received signal in order to reduce a transmitter-introduced non-linearity component of the received signal. The PDP autocorrelation value manager 1330 is capable of, configured to, or operable to support a means for determining one or more autocorrelation values for a PDP of a communication channel associated with the received signal. The matrix manager 1335 is capable of, configured to, or operable to support a means for determining a matrix for use with the one or more autocorrelation values to identify a set of multiple coefficients for use in the DPoD procedure, where the matrix is based on a precoding rule used by the network entity.

In some examples, to support determining the one or more autocorrelation values for the PDP, the report manager 1340 is capable of, configured to, or operable to support a means for receiving, from the UE, a report indicative of the one or more autocorrelation values, where the one or more autocorrelation values are based on measurements of one or more reference signals transmitted by the network entity.

In some examples, the PDP autocorrelation value manager 1330 is capable of, configured to, or operable to support a means for transmitting, to the UE, information indicative of one or more transmit antennas associated with the one or more reference signals, where the one or more autocorrelation values for the PDP are based on the information.

In some examples, the one or more autocorrelation values include an average autocorrelation value associated with the one or more transmit antennas indicated by the information.

In some examples, the information indicates organization of the one or more transmit antennas into one or more transmit antenna groups, where the one or more autocorrelation values are included in the report on a per transmit antenna group basis. In some examples, the report is received in accordance with a periodic, semi-persistent, or aperiodic schedule.

In some examples, the b-coefficient manager 1345 is capable of, configured to, or operable to support a means for identifying the set of multiple coefficients for use in the DPoD procedure based on the one or more autocorrelation values and on the matrix. In some examples, the b-coefficient manager 1345 is capable of, configured to, or operable to support a means for transmitting, to the UE and in response to the report, information indicative of the set of multiple coefficients for use in the DPoD procedure.

In some examples, the PDP autocorrelation value manager 1330 is capable of, configured to, or operable to support a means for transmitting, to the UE, first information indicative of the one or more autocorrelation values, where the one or more autocorrelation values are estimated with respect to one or more reference signals.

In some examples, to support transmitting the first information indicative of the one or more autocorrelation values, the PDP autocorrelation value manager 1330 is capable of, configured to, or operable to support a means for transmitting a weight associated with each of the set of multiple autocorrelation values for the PDP, where the weight corresponds to a percentage of transmit antennas of the network entity for which each of the set of multiple autocorrelation values is applicable.

In some examples, the matrix manager 1335 is capable of, configured to, or operable to support a means for transmitting a first control message that indicates the matrix, where identification of the set of multiple coefficients is based on the matrix and the one or more autocorrelation values. In some examples, the first control message is transmitted periodically or aperiodically.

In some examples, the matrix manager 1335 is capable of, configured to, or operable to support a means for transmitting a second control message that indicates a set of multiple matrices, where the first control message indicates the matrix from the set of multiple matrices.

In some examples, the matrix manager 1335 is capable of, configured to, or operable to support a means for receiving an uplink message that indicates a quantity of antennas used by the UE to receive the received signal, where the matrix indicated by the first control message is based on the quantity of antennas indicated by the UE.

In some examples, the matrix manager 1335 is capable of, configured to, or operable to support a means for receiving an uplink message that indicates a set of multiple quantities of antennas available to be used by the UE to receive the received signal. In some examples, the matrix manager 1335 is capable of, configured to, or operable to support a means for transmitting a control message that indicates a set of multiple matrices, each of the set of multiple matrices usable with the one or more autocorrelation values for identifying the set of multiple coefficients, each of the set of multiple matrices based on a corresponding precoding rule used by the network entity and on a respective one of the set of multiple quantities of antennas, where the matrix is one of the set of multiple matrices.

In some examples, the matrix is further based on one or more of a first quantity of UE antennas for receipt of the received signal, a second quantity of transmit antennas for transmission of the received signal, or network entity antenna correlation and topology, and where the matrix is independent of the PDP.

Figure 14:
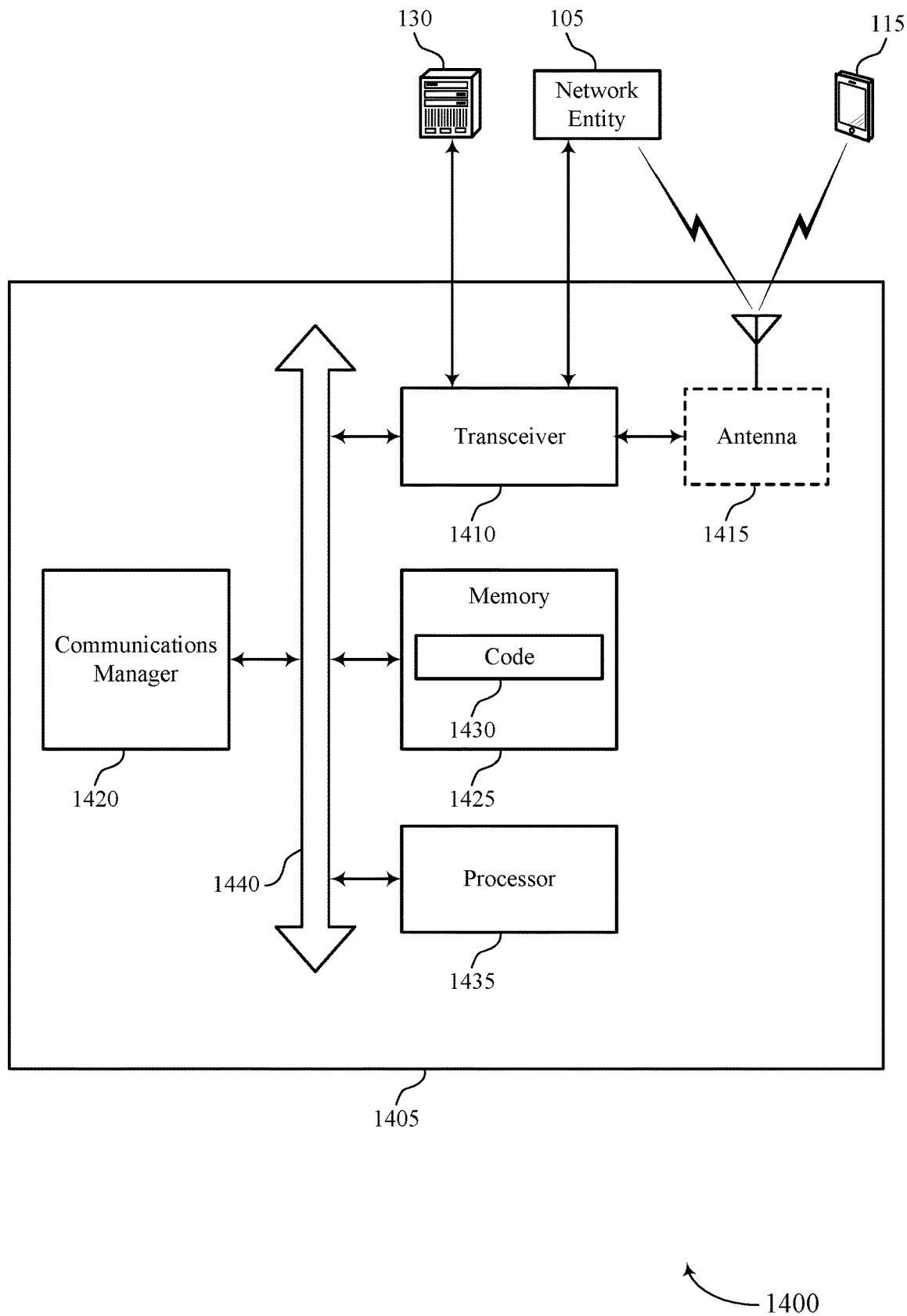
FIG. 14 shows a diagram of a system including a device that supports calculating coefficients in low-complexity DPoD procedures in accordance with one or more aspects of the present disclosure.

FIG. 14 shows a diagram of a system 1400 including a device 1405 that supports calculating coefficients in low-complexity DPoD procedures in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting calculating coefficients in low-complexity DPoD procedures). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some implementations, the at least one processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the at least one processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 is capable of, configured to, or operable to support a means for transmitting an indication that a UE is to apply a DPoD procedure to a received signal in order to reduce a transmitter-introduced non-linearity component of the received signal. The communications manager 1420 is capable of, configured to, or operable to support a means for determining one or more autocorrelation values for a PDP of a communication channel associated with the received signal. The communications manager 1420 is capable of, configured to, or operable to support a means for determining a matrix for use with the one or more autocorrelation values to identify a set of multiple coefficients for use in the DPoD procedure, where the matrix is based on a precoding rule used by the network entity.

By including or configuring the communications manager 1420 in accordance with examples as described herein, the device 1405 may support techniques for calculating coefficients in low-complexity DPoD procedures, which may reduce processing, improve utilization of resources, improve communication reliability, relax computational loads, and improve coordination between devices.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of calculating coefficients in low-complexity DPoD procedures as described herein, or the at least one processor 1435 and the at least one memory 1425 may be otherwise configured to, individually or collectively, perform or support such operations.

Figure 15:
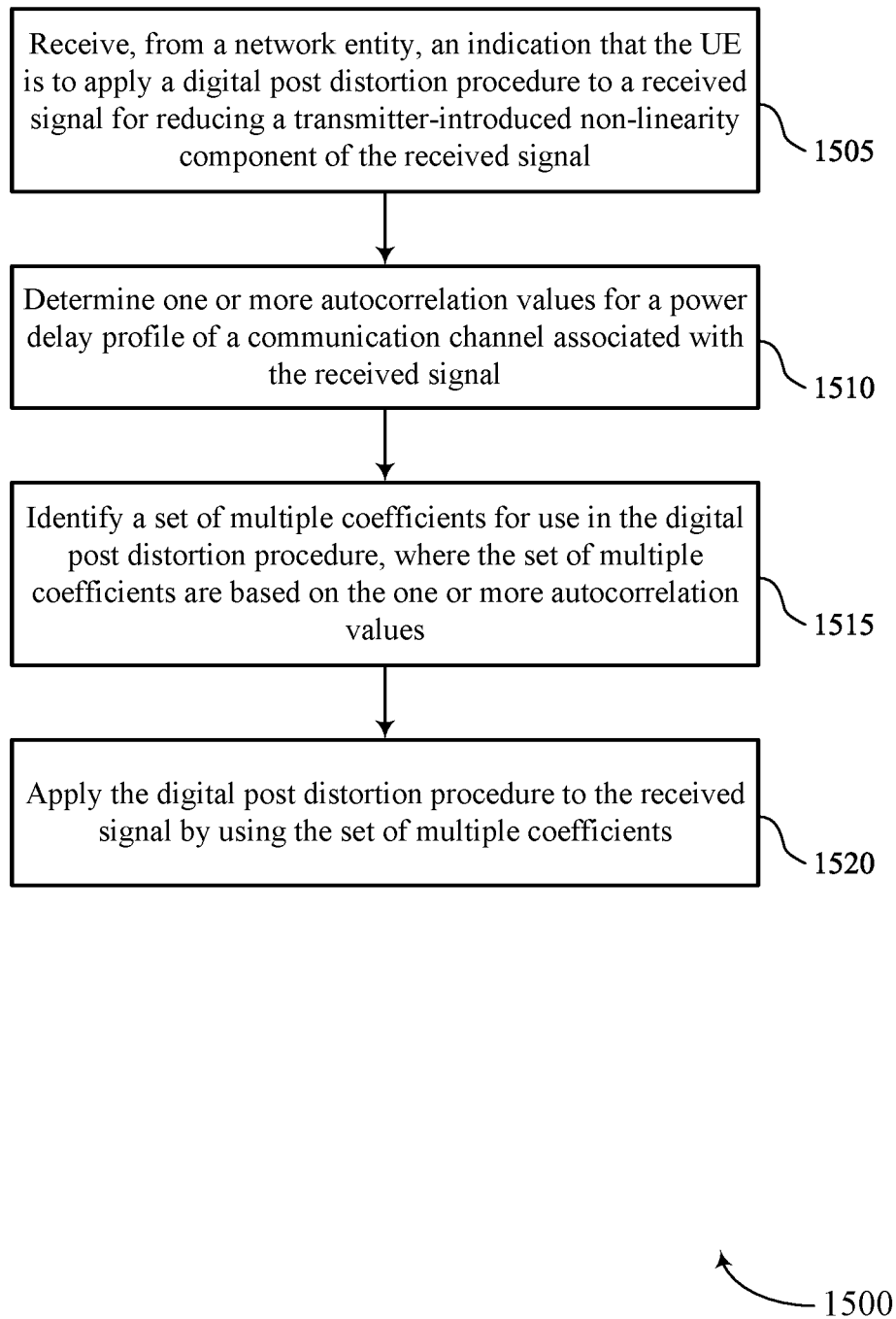
FIGS. 15 through 20 show flowcharts illustrating methods that support calculating coefficients in low-complexity DPoD procedures in accordance with one or more aspects of the present disclosure.

FIG. 15 shows a flowchart illustrating a method 1500 that supports calculating coefficients in low-complexity DPoD procedures in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, an indication that the UE is to apply a DPoD procedure to a received signal for reducing a transmitter-introduced non-linearity component of the received signal. The operations of 1505 may be performed in accordance with examples as disclosed herein. In some examples, aspects of the operations of 1505 may be performed by an indication component 925 as described with reference to FIG. 9.

At 1510, the method may include determining one or more autocorrelation values for a PDP of a communication channel associated with the received signal. The operations of 1510 may be performed in accordance with examples as disclosed herein. In some examples, aspects of the operations of 1510 may be performed by a PDP autocorrelation value component 930 as described with reference to FIG. 9.

At 1515, the method may include identifying a set of multiple coefficients for use in the DPoD procedure, where the set of multiple coefficients are based on the one or more autocorrelation values. The operations of 1515 may be performed in accordance with examples as disclosed herein. In some examples, aspects of the operations of 1515 may be performed by a b-coefficient component 935 as described with reference to FIG. 9.

At 1520, the method may include applying the DPoD procedure to the received signal by using the set of multiple coefficients. The operations of 1520 may be performed in accordance with examples as disclosed herein. In some examples, aspects of the operations of 1520 may be performed by a DPoD procedure component 940 as described with reference to FIG. 9.

Figure 16:
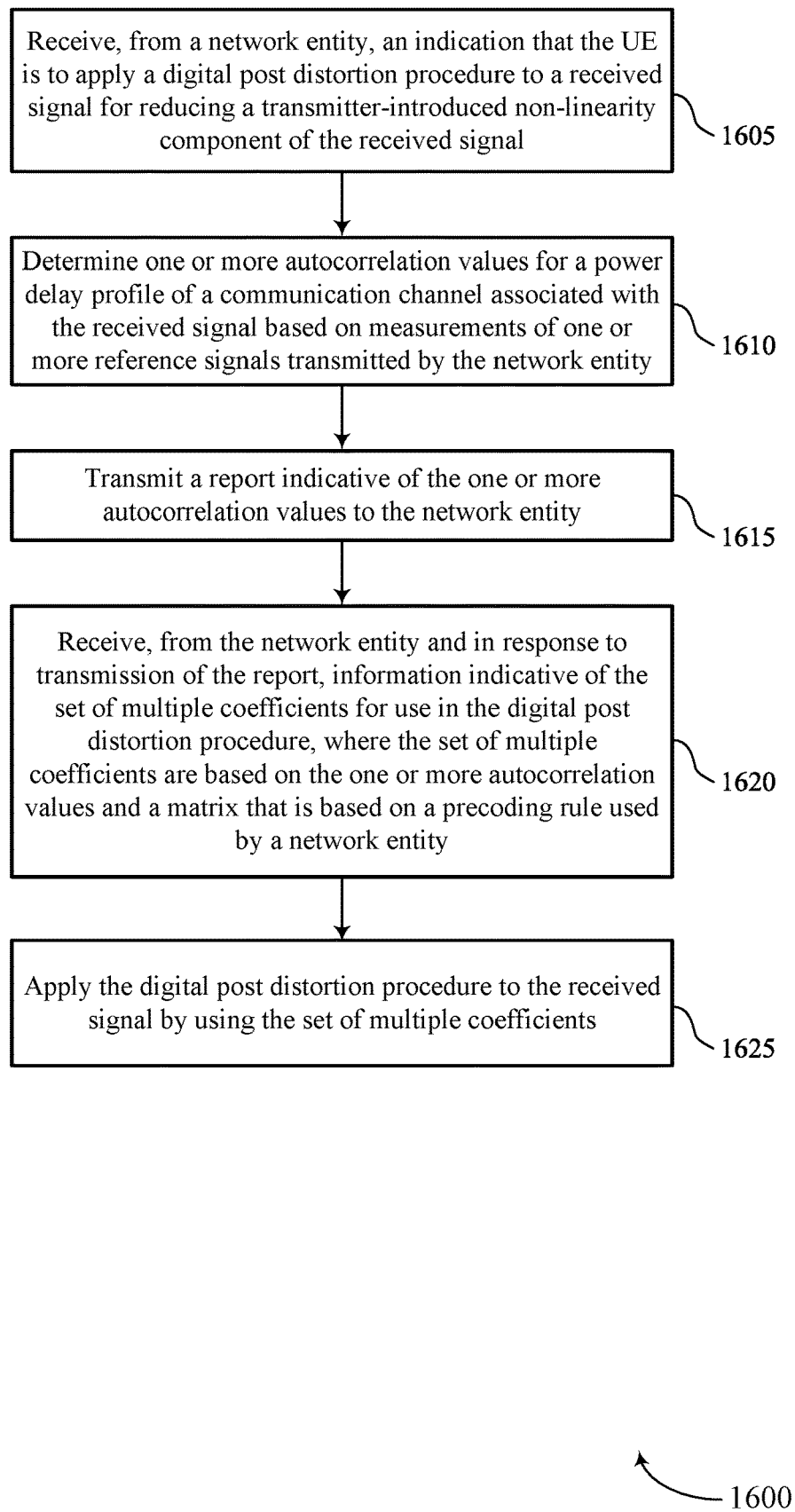

FIG. 16 shows a flowchart illustrating a method 1600 that supports calculating coefficients in low-complexity DPoD procedures in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, an indication that the UE is to apply a DPoD procedure to a received signal for reducing a transmitter-introduced non-linearity component of the received signal. The operations of 1605 may be performed in accordance with examples as disclosed herein. In some examples, aspects of the operations of 1605 may be performed by an indication component 925 as described with reference to FIG. 9.

At 1610, the method may include determining one or more autocorrelation values for a PDP of a communication channel associated with the received signal based on measurements of one or more reference signals transmitted by the network entity. The operations of 1610 may be performed in accordance with examples as disclosed herein. In some examples, aspects of the operations of 1610 may be performed by a PDP autocorrelation value component 930 as described with reference to FIG. 9.

At 1615, the method may include transmitting a report indicative of the one or more autocorrelation values to the network entity. The operations of 1615 may be performed in accordance with examples as disclosed herein. In some examples, aspects of the operations of 1615 may be performed by a report component 945 as described with reference to FIG. 9.

At 1620, the method may include receiving, from the network entity and in response to transmission of the report, information indicative of the set of multiple coefficients for use in the DPoD procedure, where the set of multiple coefficients are based on the one or more autocorrelation values and a matrix that is based on a precoding rule used by the network entity. The operations of 1620 may be performed in accordance with examples as disclosed herein. In some examples, aspects of the operations of 1620 may be performed by a b-coefficient component 935 as described with reference to FIG. 9.

At 1625, the method may include applying the DPoD procedure to the received signal by using the set of multiple coefficients. The operations of 1625 may be performed in accordance with examples as disclosed herein. In some examples, aspects of the operations of 1625 may be performed by a DPoD procedure component 940 as described with reference to FIG. 9.

Figure 17:
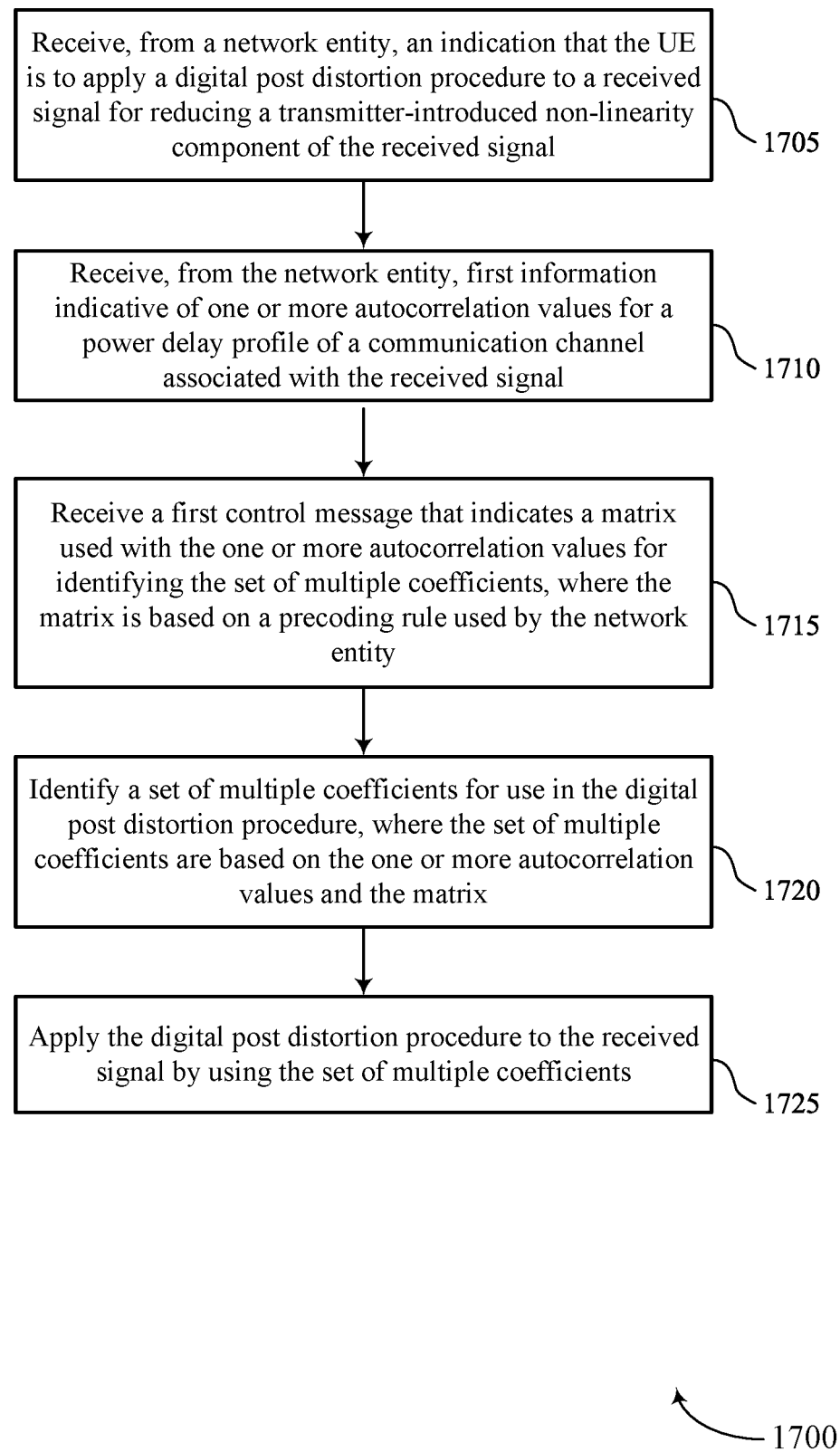

FIG. 17 shows a flowchart illustrating a method 1700 that supports calculating coefficients in low-complexity DPoD procedures in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving, from a network entity, an indication that the UE is to apply a DPoD procedure to a received signal for reducing a transmitter-introduced non-linearity component of the received signal. The operations of 1705 may be performed in accordance with examples as disclosed herein. In some examples, aspects of the operations of 1705 may be performed by an indication component 925 as described with reference to FIG. 9.

At 1710, the method may include receiving, from the network entity, first information indicative of one or more autocorrelation values for a PDP of a communication channel associated with the received signal. The operations of 1710 may be performed in accordance with examples as disclosed herein. In some examples, aspects of the operations of 1710 may be performed by a PDP autocorrelation value component 930 as described with reference to FIG. 9.

At 1715, the method may include receiving a first control message that indicates a matrix used with the one or more autocorrelation values for identifying the set of multiple coefficients, where the matrix is based on a precoding rule used by the network entity. The operations of 1715 may be performed in accordance with examples as disclosed herein. In some examples, aspects of the operations of 1715 may be performed by a matrix component 950 as described with reference to FIG. 9.

At 1720, the method may include identifying a set of multiple coefficients for use in the DPoD procedure, where the set of multiple coefficients are based on the one or more autocorrelation values and the matrix. The operations of 1720 may be performed in accordance with examples as disclosed herein. In some examples, aspects of the operations of 1720 may be performed by a b-coefficient component 935 as described with reference to FIG. 9.

At 1725, the method may include applying the DPoD procedure to the received signal by using the set of multiple coefficients. The operations of 1725 may be performed in accordance with examples as disclosed herein. In some examples, aspects of the operations of 1725 may be performed by a DPoD procedure component 940 as described with reference to FIG. 9.

Figure 18:
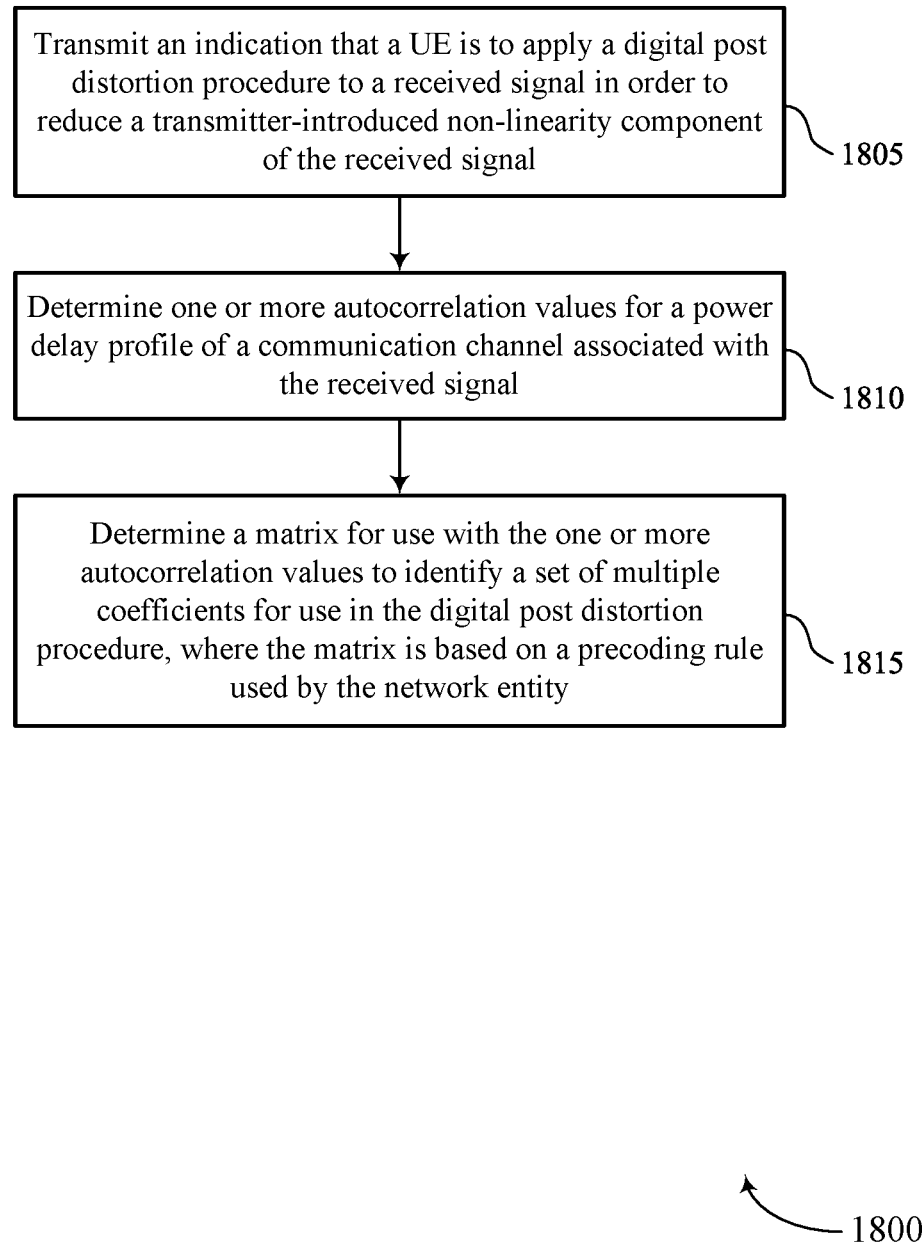

FIG. 18 shows a flowchart illustrating a method 1800 that supports calculating coefficients in low-complexity DPoD procedures in accordance with aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting an indication that a UE is to apply a DPoD procedure to a received signal in order to reduce a transmitter-introduced non-linearity component of the received signal. The operations of 1805 may be performed in accordance with examples as disclosed herein. In some examples, aspects of the operations of 1805 may be performed by a DPoD manager 1325 as described with reference to FIG. 13.

At 1810, the method may include determining one or more autocorrelation values for a PDP of a communication channel associated with the received signal. The operations of 1810 may be performed in accordance with examples as disclosed herein. In some examples, aspects of the operations of 1810 may be performed by a PDP autocorrelation value manager 1330 as described with reference to FIG. 13.

At 1815, the method may include determining a matrix for use with the one or more autocorrelation values to identify a set of multiple coefficients for use in the DPoD procedure, where the matrix is based on a precoding rule used by the network entity. The operations of 1815 may be performed in accordance with examples as disclosed herein. In some examples, aspects of the operations of 1815 may be performed by a matrix manager 1335 as described with reference to FIG. 13.

Figure 19:
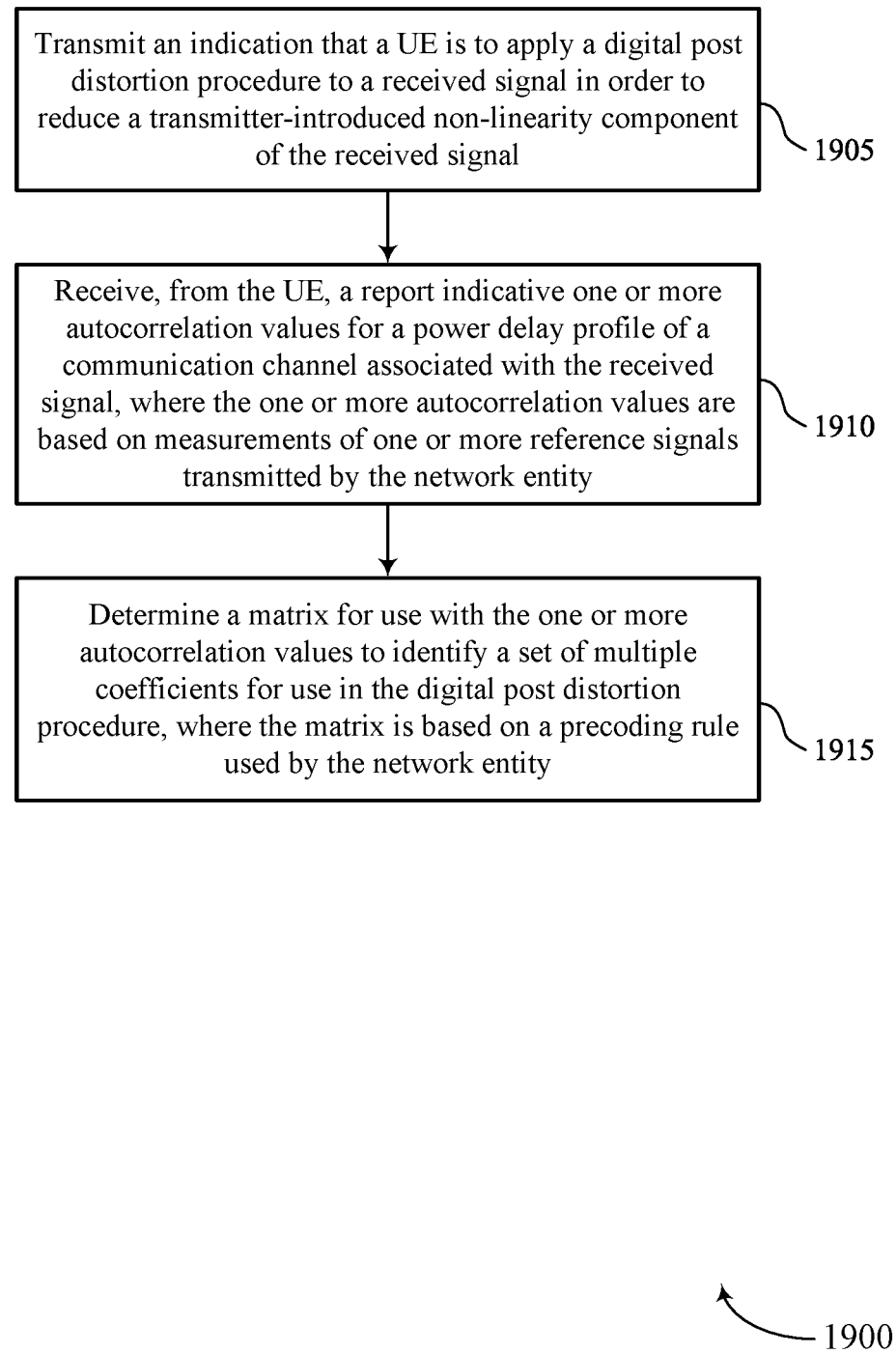

FIG. 19 shows a flowchart illustrating a method 1900 that supports calculating coefficients in low-complexity DPoD procedures in accordance with aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include transmitting an indication that a UE is to apply a DPoD procedure to a received signal in order to reduce a transmitter-introduced non-linearity component of the received signal. The operations of 1905 may be performed in accordance with examples as disclosed herein. In some examples, aspects of the operations of 1905 may be performed by a DPoD manager 1325 as described with reference to FIG. 13.

At 1910, the method may include receiving, from the UE, a report indicative of one or more autocorrelation values for a PDP of a communication channel associated with the received signal, where the one or more autocorrelation values are based on measurements of one or more reference signals transmitted by the network entity. The operations of 1910 may be performed in accordance with examples as disclosed herein. In some examples, aspects of the operations of 1910 may be performed by a report manager 1340 as described with reference to FIG. 13.

At 1915, the method may include determining a matrix for use with the one or more autocorrelation values to identify a set of multiple coefficients for use in the DPoD procedure, where the matrix is based on a precoding rule used by the network entity. The operations of 1915 may be performed in accordance with examples as disclosed herein. In some examples, aspects of the operations of 1915 may be performed by a matrix manager 1335 as described with reference to FIG. 13.

Figure 20:
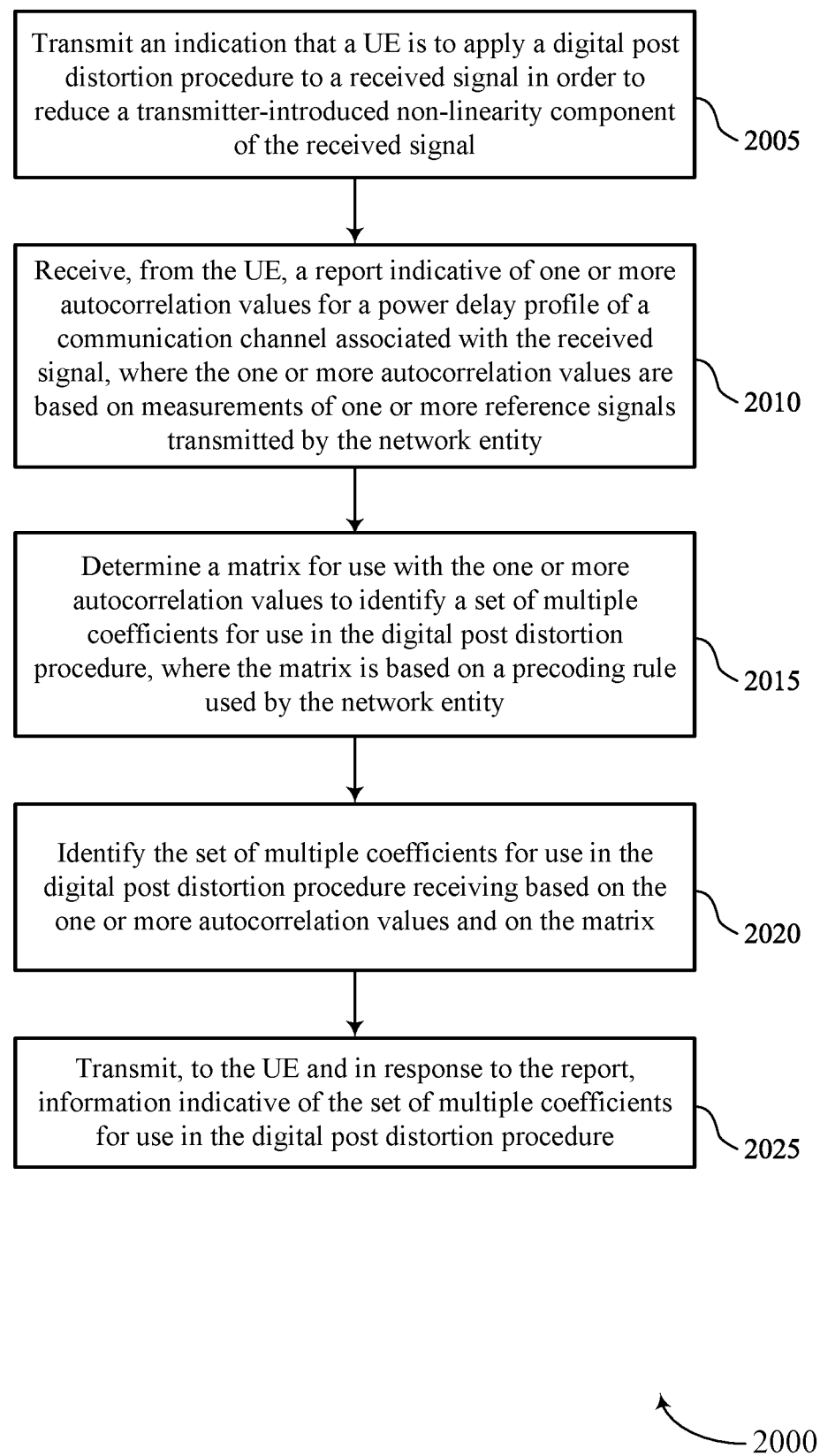

FIG. 20 shows a flowchart illustrating a method 2000 that supports calculating coefficients in low-complexity DPoD procedures in accordance with aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include transmitting an indication that a UE is to apply a DPoD procedure to a received signal in order to reduce a transmitter-introduced non-linearity component of the received signal. The operations of 2005 may be performed in accordance with examples as disclosed herein. In some examples, aspects of the operations of 2005 may be performed by a DPoD manager 1325 as described with reference to FIG. 13.

At 2010, the method may include receiving, from the UE, a report indicative of one or more autocorrelation values for a PDP of a communication channel associated with the received signal, where the one or more autocorrelation values are based on measurements of one or more reference signals transmitted by the network entity. The operations of 2010 may be performed in accordance with examples as disclosed herein. In some examples, aspects of the operations of 2010 may be performed by a report manager 1340 as described with reference to FIG. 13.

At 2015, the method may include determining a matrix for use with the one or more autocorrelation values to identify a set of multiple coefficients for use in the DPoD procedure, where the matrix is based on a precoding rule used by the network entity. The operations of 2015 may be performed in accordance with examples as disclosed herein. In some examples, aspects of the operations of 2015 may be performed by a matrix manager 1335 as described with reference to FIG. 13.

At 2020, the method may include identifying the set of multiple coefficients for use in the DPoD procedure based on the one or more autocorrelation values and on the matrix. The operations of 2020 may be performed in accordance with examples as disclosed herein. In some examples, aspects of the operations of 2020 may be performed by a b-coefficient manager 1345 as described with reference to FIG. 13.

At 2025, the method may include transmitting, to the UE and in response to the report, information indicative of the set of multiple coefficients for use in the DPoD procedure. The operations of 2025 may be performed in accordance with examples as disclosed herein. In some examples, aspects of the operations of 2025 may be performed by a b-coefficient manager 1345 as described with reference to FIG. 13.

The following provides an overview of aspects of the present disclosure:

Aspect 1: A method for wireless communications by a UE, comprising: receiving, from a network entity, an indication that the UE is to apply a DPoD procedure to a received signal for reducing a transmitter-introduced non-linearity component of the received signal; determining one or more autocorrelation values for a PDP of a communication channel associated with the received signal; identifying a plurality of coefficients for use in the DPoD procedure, wherein the plurality of coefficients are based at least in part on the one or more autocorrelation values; and applying the DPoD procedure to the received signal by using the plurality of coefficients.

Aspect 2: The method of aspect 1, wherein determining the one or more autocorrelation values for the PDP comprises: determining the one or more autocorrelation values for the PDP based at least in part on measurements of one or more reference signals transmitted by the network entity.

Aspect 3: The method of aspect 2, further comprising: receiving, from the network entity, information indicative of one or more transmit antennas associated with the one or more reference signals, wherein the UE determines the one or more autocorrelation values for the PDP based at least in part on the information.

Aspect 4: The method of aspect 3, wherein determining the one or more autocorrelation values comprises: determining an average autocorrelation value associated with the one or more transmit antennas indicated by the information.

Aspect 5: The method of any of aspects 3 through 4, wherein the information indicates organization of the one or more transmit antennas into one or more transmit antenna groups, wherein the UE determines an autocorrelation value for each of the one or more transmit antenna groups.

Aspect 6: The method of any of aspects 2 through 5, further comprising: transmitting a report indicative of the one or more autocorrelation values to the network entity.

Aspect 7: The method of aspect 6, wherein the report is transmitted in accordance with a periodic, semi-persistent, or aperiodic schedule.

Aspect 8: The method of any of aspects 6 through 7, wherein identifying the plurality of coefficients comprises: receiving, from the network entity and in response to transmission of the report, information indicative of the plurality of coefficients for use in the DPoD procedure, wherein the plurality of coefficients are based at least in part on the one or more autocorrelation values and a matrix that is based at least in part on a precoding rule used by a network entity.

Aspect 9: The method of any of aspects 1 through 8, wherein determining the one or more autocorrelation values for the PDP comprises: receiving, from the network entity, first information indicative of the one or more autocorrelation values.

Aspect 10: The method of aspect 9, wherein the one or more autocorrelation values is a plurality of autocorrelation values, and wherein receiving the first information indicative of the one or more autocorrelation values comprises: receiving a weight associated with each of the plurality of autocorrelation values for the PDP, wherein the weight corresponds to a percentage of transmit antennas of the network entity for which each of the plurality of autocorrelation values is applicable.

Aspect 11: The method of any of aspects 9 through 10, further comprising: receiving a first control message that indicates a matrix used with the one or more autocorrelation values for identifying the plurality of coefficients, wherein the matrix is based at least in part on a precoding rule used by the network entity.

Aspect 12: The method of aspect 11, wherein the first control message is received periodically or aperiodically.

Aspect 13: The method of any of aspects 11 through 12, further comprising: receiving a second control message that indicates a plurality of matrices, wherein the first control message indicates the matrix from the plurality of matrices.

Aspect 14: The method of any of aspects 11 through 13, further comprising: transmitting an uplink message that indicates a quantity of antennas used by the UE to receive the received signal, wherein the matrix indicated by the first control message is based on the quantity of antennas indicated by the UE.

Aspect 15: The method of any of aspects 9 through 14, further comprising: transmitting an uplink message that indicates a plurality of quantities of antennas available to be used by the UE to receive the received signal; receiving a control message that indicates a plurality of matrices, each of the plurality of matrices usable with the one or more autocorrelation values for identifying the plurality of coefficients, each of the plurality of matrices based on a corresponding precoding rule used by the network entity and on a respective one of the plurality of quantities of antennas; and selecting a matrix from the plurality of matrices based at least in part on a quantity of antennas used by the UE to receive the received signal.

Aspect 16: The method of any of aspects 1 through 15, further comprising: determining the plurality of coefficients for use in the DPoD procedure based at least in part on the one or more autocorrelation values and a matrix that is based at least in part on a precoding rule used by the network entity.

Aspect 17: The method of aspect 16, wherein the matrix is further based on one or more of a first quantity of UE antennas for receipt of the received signal, a second quantity of transmit antennas for transmission of the received signal, or network entity antenna correlation and topology, and wherein the matrix is independent of the PDP.

Aspect 18: A method for wireless communications by a network entity, comprising: transmitting an indication that a UE is to apply a DPoD procedure to a received signal in order to reduce a transmitter-introduced non-linearity component of the received signal; determining one or more autocorrelation values for a PDP of a communication channel associated with the received signal; and determining a matrix for use with the one or more autocorrelation values to identify a plurality of coefficients for use in the DPoD procedure, wherein the matrix is based at least in part on a precoding rule used by the network entity.

Aspect 19: The method of aspect 18, wherein determining the one or more autocorrelation values for the PDP comprises: receiving, from the UE, a report indicative of the one or more autocorrelation values, wherein the one or more autocorrelation values are based at least in part on measurements of one or more reference signals transmitted by the network entity.

Aspect 20: The method of aspect 19, further comprising: transmitting, to the UE, information indicative of one or more transmit antennas associated with the one or more reference signals, wherein the one or more autocorrelation values for the PDP are based at least in part on the information.

Aspect 21: The method of aspect 20, wherein the one or more autocorrelation values include an average autocorrelation value associated with the one or more transmit antennas indicated by the information.

Aspect 22: The method of any of aspects 20 through 21, wherein the information indicates organization of the one or more transmit antennas into one or more transmit antenna groups, wherein the one or more autocorrelation values are included in the report on a per transmit antenna group basis.

Aspect 23: The method of any of aspects 19 through 22, wherein the report is received in accordance with a periodic, semi-persistent, or aperiodic schedule.

Aspect 24: The method of any of aspects 19 through 23, further comprising: identifying the plurality of coefficients for use in the DPoD procedure based at least in part on the one or more autocorrelation values and on the matrix; and transmitting, to the UE and in response to the report, information indicative of the plurality of coefficients for use in the DPoD procedure.

Aspect 25: The method of any of aspects 18 through 24, further comprising: transmitting, to the UE, first information indicative of the one or more autocorrelation values, wherein the one or more autocorrelation values are estimated with respect to one or more reference signals.

Aspect 26: The method of aspect 25, wherein the one or more autocorrelation values are a plurality of autocorrelation values, and wherein transmitting the first information indicative of the one or more autocorrelation values comprises: transmitting a weight associated with each of the plurality of autocorrelation values for the PDP, wherein the weight corresponds to a percentage of transmit antennas of the network entity for which each of the plurality of autocorrelation values is applicable.

Aspect 27: The method of any of aspects 25 through 26, further comprising: transmitting a first control message that indicates the matrix, wherein identification of the plurality of coefficients is based at least in part on the matrix and the one or more autocorrelation values.

Aspect 28: The method of aspect 27, wherein the first control message is transmitted periodically or aperiodically.

Aspect 29: The method of any of aspects 27 through 28, further comprising: transmitting a second control message that indicates a plurality of matrices, wherein the first control message indicates the matrix from the plurality of matrices.

Aspect 30: The method of any of aspects 27 through 29, further comprising: receiving an uplink message that indicates a quantity of antennas used by the UE to receive the received signal, wherein the matrix indicated by the first control message is based on the quantity of antennas indicated by the UE.

Aspect 31: The method of any of aspects 25 through 30, further comprising: receiving an uplink message that indicates a plurality of quantities of antennas available to be used by the UE to receive the received signal; and transmitting a control message that indicates a plurality of matrices, each of the plurality of matrices usable with the one or more autocorrelation values for identifying the plurality of coefficients, each of the plurality of matrices based on a corresponding precoding rule used by the network entity and on a respective one of the plurality of quantities of antennas, wherein the matrix is one of the plurality of matrices.

Aspect 32: The method of any of aspects 18 through 31, wherein the matrix is further based on one or more of a first quantity of UE antennas for receipt of the received signal, a second quantity of transmit antennas for transmission of the received signal, or network entity antenna correlation and topology, and wherein the matrix is independent of the PDP.

Aspect 33: A UE for wireless communications, comprising one or more memories storing processor-executable code, and one or more processors coupled with the one or more memories and individually or collectively operable to execute the code to cause the UE to perform a method of any of aspects 1 through 17.

Aspect 34: A UE for wireless communications, comprising at least one means for performing a method of any of aspects 1 through 17.

Aspect 35: A non-transitory computer-readable medium storing code for wireless communications, the code comprising instructions executable by a processor to perform a method of any of aspects 1 through 17.

Aspect 36: A network entity for wireless communications, comprising one or more memories storing processor-executable code, and one or more processors coupled with the one or more memories and individually or collectively operable to execute the code to cause the network entity to perform a method of any of aspects 18 through 32.

Aspect 37: A network entity for wireless communications, comprising at least one means for performing a method of any of aspects 18 through 32.

Aspect 38: A non-transitory computer-readable medium storing code for wireless communications, the code comprising instructions executable by a processor to perform a method of any of aspects 18 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   one or more memories storing processor-executable code; and
   one or more processors coupled with the one or more memories and individually or collectively operable to execute the code to cause the UE to:
   receive, from a network entity, an indication that the UE is to apply a digital post distortion procedure to a received signal for reducing a transmitter-introduced non-linearity component of the received signal;
   determine one or more autocorrelation values for a power delay profile of a communication channel associated with the received signal;

identify a plurality of coefficients for use in the digital post distortion procedure, wherein the plurality of coefficients are based at least in part on the one or more autocorrelation values; and apply the digital post distortion procedure to the received signal by using the plurality of coefficients.

2. The UE of claim 1, wherein, to determine the one or more autocorrelation values for the power delay profile, the one or more processors are individually or collectively operable to execute the code to cause the user equipment (UE) to:

determine the one or more autocorrelation values for the power delay profile based at least in part on measurements of one or more reference signals transmitted by the network entity.

3. The UE of claim 2, wherein the one or more processors are individually or collectively further operable to execute the code to cause the UE to:

receive, from the network entity, information indicative of one or more transmit antennas associated with the one or more reference signals, wherein the UE determines the one or more autocorrelation values for the power delay profile based at least in part on the information.

4. The UE of claim 3, wherein, to determine the one or more autocorrelation values, the one or more processors are individually or collectively operable to execute the code to cause the UE to:

determine an average autocorrelation value associated with the one or more transmit antennas indicated by the information.

5. The UE of claim 3, wherein the information indicates organization of the one or more transmit antennas into one or more transmit antenna groups, wherein the UE determines an autocorrelation value for each of the one or more transmit antenna groups.

6. The UE of claim 2, wherein the one or more processors are individually or collectively further operable to execute the code to cause the UE to:

transmit a report indicative of the one or more autocorrelation values to the network entity.

7. The UE of claim 6, wherein the report is transmitted in accordance with a periodic, semi-persistent, or aperiodic schedule.

8. The UE of claim 6, wherein, to identify the plurality of coefficients, the one or more processors are individually or collectively operable to execute the code to cause the UE to:

receive, from the network entity and in response to transmission of the report, information indicative of the plurality of coefficients for use in the digital post distortion procedure, wherein the plurality of coefficients are based at least in part on the one or more autocorrelation values and a matrix that is based at least in part on a precoding rule used by the network entity.

9. The UE of claim 1, wherein, to determine the one or more autocorrelation values for the power delay profile, the one or more processors are individually or collectively operable to execute the code to cause the UE to:

receive, from the network entity, first information indicative of the one or more autocorrelation values.

10. The UE of claim 9, wherein, to receive the first information indicative of the one or more autocorrelation values, the one or more processors are individually or collectively operable to execute the code to cause the UE to:

receive a weight associated with each of the one or more autocorrelation values for the power delay profile, wherein the weight corresponds to a percentage of transmit antennas of the network entity for which each of the one or more autocorrelation values is applicable.

11. The UE of claim 9, wherein the one or more processors are individually or collectively further operable to execute the code to cause the UE to:

receive a first control message that indicates a matrix, wherein the matrix is based at least in part on a precoding rule used by the network entity, and wherein identification of the plurality of coefficients is based at least in part on the matrix and the one or more autocorrelation values.

12. The UE of claim 11, wherein the first control message is received periodically or aperiodically.

13. The UE of claim 11, wherein the one or more processors are individually or collectively further operable to execute the code to cause the UE to:

receive a second control message that indicates a plurality of matrices, wherein the first control message indicates the matrix from the plurality of matrices.

14. The UE of claim 11, wherein the one or more processors are individually or collectively further operable to execute the code to cause the UE to:

transmit an uplink message that indicates a quantity of antennas used by the UE to receive the received signal, wherein the matrix indicated by the first control message is based on the quantity of antennas indicated by the UE.

15. The UE of claim 9, wherein the one or more processors are individually or collectively further operable to execute the code to cause the UE to:

transmit an uplink message that indicates a plurality of quantities of antennas available to be used by the UE to receive the received signal;

receive a control message that indicates a plurality of matrices, each of the plurality of matrices usable with the one or more autocorrelation values for identifying the plurality of coefficients, each of the plurality of matrices based on a corresponding precoding rule used by the network entity and on a respective one of the plurality of quantities of antennas; and select a matrix from the plurality of matrices based at least in part on a quantity of antennas used by the UE to receive the received signal.

16. The UE of claim 1, wherein the one or more processors are individually or collectively further operable to execute the code to cause the UE to:

determine the plurality of coefficients for use in the digital post distortion procedure based at least in part on the one or more autocorrelation values and a matrix that is based at least in part on a precoding rule used by the network entity.

17. The UE of claim 16, wherein the matrix is further based on one or more of a first quantity of UE antennas for receipt of the received signal, a second quantity of transmit antennas for transmission of the received signal, or network entity antenna correlation and topology, and wherein the matrix is independent of the power delay profile.

18. A network entity for wireless communication, comprising:

one or more memories storing processor-executable code; and one or more processors coupled with the one or more memories and individually or collectively operable to execute the code to cause the network entity to:

transmit an indication that a user equipment (UE) is to apply a digital post distortion procedure to a received signal in order to reduce a transmitter-introduced non-linearity component of the received signal;

determine one or more autocorrelation values for a power delay profile of a communication channel associated with the received signal; and determine a matrix for use with the one or more autocorrelation values to identify a plurality of coefficients for use in the digital post distortion procedure, wherein the matrix is based at least in part on a precoding rule used by the network entity.

19. The network entity of claim 18, wherein, to determine the one or more autocorrelation values for the power delay profile, the one or more processors are individually or collectively operable to execute the code to cause the network entity to:

receive, from the UE, a report indicative of the one or more autocorrelation values, wherein the one or more autocorrelation values are based at least in part on measurements of one or more reference signals transmitted by the network entity.

20. The network entity of claim 19, wherein the one or more processors are individually or collectively further operable to execute the code to cause the network entity to:

transmit, to the UE, information indicative of one or more transmit antennas associated with the one or more reference signals, wherein the one or more autocorrelation values for the power delay profile are based at least in part on the information.

21. The network entity of claim 20, wherein the one or more autocorrelation values include an average autocorrelation value associated with the one or more transmit antennas indicated by the information.

22. The network entity of claim 20, wherein the information indicates organization of the one or more transmit antennas into one or more transmit antenna groups, wherein the one or more autocorrelation values are included in the report on a per transmit antenna group basis.

23. The network entity of claim 19, wherein the report is received in accordance with a periodic, semi-persistent, or aperiodic schedule.

24. The network entity of claim 19, wherein the one or more processors are individually or collectively further operable to execute the code to cause the network entity to:

identify the plurality of coefficients for use in the digital post distortion procedure based at least in part on the one or more autocorrelation values and on the matrix; and transmit, to the UE and in response to the report, information indicative of the plurality of coefficients for use in the digital post distortion procedure.

25. The network entity of claim 18, wherein the one or more processors are individually or collectively further operable to execute the code to cause the network entity to:

transmit, to the UE, first information indicative of the one or more autocorrelation values, wherein the one or more autocorrelation values are estimated with respect to one or more reference signals.

26. The network entity of claim 25, wherein, to transmit the first information indicative of the one or more autocorrelation values, the one or more processors are individually or collectively operable to execute the code to cause the network entity to:

transmit a weight associated with each of the one or more autocorrelation values for the power delay profile, wherein the weight corresponds to a percentage of transmit antennas of the network entity for which each of the one or more autocorrelation values is applicable.

27. The network entity of claim 25, wherein the one or more processors are individually or collectively further operable to execute the code to cause the network entity to:

transmit a first control message that indicates the matrix, wherein identification of the plurality of coefficients is based at least in part on the matrix and the one or more autocorrelation values.

28. The network entity of claim 27, wherein the first control message is transmitted periodically or aperiodically.

29. A method for wireless communications by a user equipment (UE), comprising:

receiving, from a network entity, an indication that the UE is to apply a digital post distortion procedure to a received signal for reducing a transmitter-introduced non-linearity component of the received signal;

determining one or more autocorrelation values for a power delay profile of a communication channel associated with the received signal;

identifying a plurality of coefficients for use in the digital post distortion procedure, wherein the plurality of coefficients are based at least in part on the one or more autocorrelation values; and applying the digital post distortion procedure to the received signal by using the plurality of coefficients.

30. A method for wireless communications by a network entity, comprising:

transmitting an indication that a user equipment (UE) is to apply a digital post distortion procedure to a received signal in order to reduce a transmitter-introduced non-linearity component of the received signal;

determining one or more autocorrelation values for a power delay profile of a communication channel associated with the received signal; and determining a matrix for use with the one or more autocorrelation values to identify a plurality of coefficients for use in the digital post distortion procedure, wherein the matrix is based at least in part on a precoding rule used by the network entity.

* * * * *